(12) United States Patent
Saperstein et al.

(10) Patent No.: US 10,346,410 B2
(45) Date of Patent: *Jul. 9, 2019

(54) MALICIOUS ACTIVITY DETECTION SYSTEM CAPABLE OF EFFICIENTLY PROCESSING DATA ACCESSED FROM DATABASES AND GENERATING ALERTS FOR DISPLAY IN INTERACTIVE USER INTERFACES

(71) Applicant: Palantir Technologies Inc., Palo Alto, CA (US)

(72) Inventors: Craig Saperstein, New York, NY (US); Eric Schwartz, New York, NY (US); Hongjai Cho, Jersey City, NJ (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/866,099

(22) Filed: Jan. 9, 2018

(65) Prior Publication Data

US 2018/0173769 A1 Jun. 21, 2018

Related U.S. Application Data

(63) Continuation of application No. 15/336,078, filed on Oct. 27, 2016, now Pat. No. 9,898,509, which is a
(Continued)

(51) Int. Cl.
*H04L 29/00* (2006.01)
*G06F 16/2457* (2019.01)
(Continued)

(52) U.S. Cl.
CPC .... *G06F 16/24575* (2019.01); *G06F 16/2365* (2019.01); *G06F 16/248* (2019.01);
(Continued)

(58) Field of Classification Search
CPC ......... G06F 17/30528; G06F 17/30867; G06F 17/30466; G06F 17/30371; G06F 21/55;
(Continued)

(56) References Cited

U.S. PATENT DOCUMENTS 5,109,399 A 4/1992 Thompson
5,329,108 A 7/1994 Lamoure
(Continued)

FOREIGN PATENT DOCUMENTS

CN 102546446 7/2012
CN 103167093 6/2013
(Continued)

OTHER PUBLICATIONS

US 8,712,906 B1, 04/2014, Sprague et al. (withdrawn)
(Continued)

*Primary Examiner* — Ellen Tran
*Assistant Examiner* — Helai Salehi
(74) *Attorney, Agent, or Firm* — Knobbe Martens Olson & Bear LLP

(57) ABSTRACT

Various systems and methods are provided that retrieve raw data from issuers, reorganize the raw data, analyze the reorganized data to determine whether the risky or malicious activity is occurring, and generate alerts to notify users of possible malicious activity. For example, the raw data is included in a plurality of tables. The system joins one or more tables to reorganize the data using several filtering techniques to reduce the processor load required to perform the join operation. Once the data is reorganized, the system executes one or more rules to analyze the reorganized data. Each rule is associated with a malicious activity. If any of the rules indicate that malicious activity is occurring, the system generates an alert for display to a user in an interactive user interface.

20 Claims, 25 Drawing Sheets

Related U.S. Application Data continuation of application No. 15/017,324, filed on Feb. 5, 2016, now Pat. No. 9,485,265.

(60) Provisional application No. 62/211,520, filed on Aug. 28, 2015.

(51) Int. Cl.

| | | |
|---|---|---|
| *H04L 29/06* | (2006.01) | |
| *G06F 16/248* | (2019.01) | |
| *G06F 16/23* | (2019.01) | |
| *G06F 16/9535* | (2019.01) | |
| *G06F 16/2453* | (2019.01) | |
| *G06Q 20/40* | (2012.01) | |
| *G06Q 40/00* | (2012.01) | |
| *G06F 16/2455* | (2019.01) | |

(52) U.S. Cl.
CPC .... *G06F 16/2456* (2019.01); *G06F 16/24544* (2019.01); *G06F 16/9535* (2019.01); *G06Q 20/4016* (2013.01); *G06Q 40/12* (2013.12); *H04L 63/1416* (2013.01); *H04L 63/1425* (2013.01); *H04L 63/20* (2013.01); *H04L 2463/102* (2013.01)

(58) Field of Classification Search
CPC ............... G06F 17/30554; H04L 63/20; H04L 2463/102; H04L 63/1416; H04L 29/06938; H04L 29/06911; H04L 29/06925; H04L 29/06931; G06Q 20/4016; G06Q 40/12
See application file for complete search history.

(56) References Cited

U.S. PATENT DOCUMENTS

| | | |
|---|---|---|
| 5,670,987 A | 9/1997 | Doi et al. |
| 5,781,704 A | 7/1998 | Rossmo |
| 5,798,769 A | 8/1998 | Chiu et al. |
| 5,819,226 A | 10/1998 | Gopinathan et al. |
| 5,845,300 A | 12/1998 | Comer |
| 5,892,900 A | 4/1999 | Ginter et al. |
| 6,057,757 A | 5/2000 | Arrowsmith et al. |
| 6,091,956 A | 7/2000 | Hollenberg |
| 6,094,643 A | 7/2000 | Anderson et al. |
| 6,161,098 A | 12/2000 | Wallman |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,430,305 B1 | 8/2002 | Decker |
| 6,456,997 B1 | 9/2002 | Shukla |
| 6,549,944 B1 | 4/2003 | Weinberg et al. |
| 6,560,620 B1 | 5/2003 | Ching |
| 6,567,936 B1 | 5/2003 | Yang et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,714,936 B1 | 3/2004 | Nevin, III |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,373,669 B2 | 5/2008 | Eisen |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,451,397 B2 | 11/2008 | Weber et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,756,843 B1 | 7/2010 | Palmer |
| 7,770,100 B2 | 8/2010 | Chamberlain et al. |
| 7,783,658 B1 | 8/2010 | Bayliss |
| 7,805,457 B1 | 9/2010 | Viola et al. |
| 7,809,703 B2 | 10/2010 | Balabhadrapatruni et al. |
| 7,814,102 B2 | 10/2010 | Miller et al. |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,046,362 B2 | 10/2011 | Bayliss |
| 8,054,756 B2 | 11/2011 | Chand et al. |
| 8,103,543 B1 | 1/2012 | Zwicky |
| 8,134,457 B2 | 3/2012 | Velipasalar et al. |
| 8,135,679 B2 | 3/2012 | Bayliss |
| 8,135,719 B2 | 3/2012 | Bayliss |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,490 B1 | 7/2012 | Vos et al. |

(56) References Cited

U.S. PATENT DOCUMENTS

| | | |
|---|---|---|
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,266,168 B2 | 9/2012 | Bayliss |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,321,943 B1 | 11/2012 | Walters et al. |
| 8,347,398 B1 | 1/2013 | Weber |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,674 B2 | 5/2013 | Choudhuri et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,484,168 B2 | 7/2013 | Bayliss |
| 8,489,331 B2 | 7/2013 | Kopf et al. |
| 8,489,641 B1 | 7/2013 | Seefeld et al. |
| 8,495,077 B2 | 7/2013 | Bayliss |
| 8,498,969 B2 | 7/2013 | Bayliss |
| 8,498,984 B1 | 7/2013 | Hwang et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,600,872 B1 | 12/2013 | Yan |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,666,861 B2 | 3/2014 | Li et al. |
| 8,676,857 B1 | 3/2014 | Adams et al. |
| 8,688,573 B1 | 4/2014 | Ruknoic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,798,354 B1 | 8/2014 | Bunzel et al. |
| 8,799,799 B1 | 8/2014 | Cervelli et al. |
| 8,812,960 B1 | 8/2014 | Sun et al. |
| 8,818,892 B1 | 8/2014 | Sprague et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 8,949,164 B1 | 2/2015 | Mohler |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,032,531 B1 | 5/2015 | Scorvo et al. |
| 9,043,696 B1 | 5/2015 | Meiklejohn et al. |
| 9,043,894 B1 | 5/2015 | Dennison et al. |
| 9,100,428 B1 | 8/2015 | Visbal |
| 9,129,219 B1 | 9/2015 | Robertson et al. |
| 9,552,615 B2 | 1/2017 | Mathura et al. |
| 9,898,509 B2 | 2/2018 | Saperstein et al. |
| 2001/0027424 A1 | 10/2001 | Torigoe |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0147805 A1 | 10/2002 | Leshem et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0033228 A1 | 2/2003 | Bosworth-Davies et al. |
| 2003/0039948 A1 | 2/2003 | Donahue |
| 2003/0097330 A1 | 5/2003 | Hillmer et al. |
| 2003/0126102 A1 | 7/2003 | Borthwick |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0111480 A1 | 6/2004 | Yue |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0163039 A1 | 8/2004 | Gorman |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0080769 A1 | 4/2005 | Gemmell |
| 2005/0086207 A1 | 4/2005 | Heuer et al. |
| 2005/0108063 A1 | 5/2005 | Madill et al. |
| 2005/0125715 A1 | 6/2005 | Di Franco et al. |
| 2005/0133588 A1 | 6/2005 | Williams |
| 2005/0149455 A1 | 7/2005 | Bruesewitz et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0222928 A1 | 10/2005 | Steier et al. |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |

(56) References Cited

U.S. PATENT DOCUMENTS

| | | |
|---|---|---|
| 2006/0242040 A1 | 10/2006 | Rader et al. |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0061259 A1 | 3/2007 | Zoldi et al. |
| 2007/0078832 A1 | 4/2007 | Ott et al. |
| 2007/0083541 A1 | 4/2007 | Fraleigh et al. |
| 2007/0106582 A1 | 5/2007 | Baker et al. |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0174760 A1 | 7/2007 | Chamberlain et al. |
| 2007/0185867 A1 | 8/2007 | Maga |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0239606 A1 | 10/2007 | Eisen |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294200 A1 | 12/2007 | Au |
| 2007/0294643 A1 | 12/2007 | Kyle |
| 2008/0040684 A1 | 2/2008 | Crump |
| 2008/0046481 A1 | 2/2008 | Gould et al. |
| 2008/0051989 A1 | 2/2008 | Welsh |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0082374 A1 | 4/2008 | Kennis et al. |
| 2008/0103798 A1 | 5/2008 | Domenikos et al. |
| 2008/0103996 A1 | 5/2008 | Forman et al. |
| 2008/0104019 A1 | 5/2008 | Nath |
| 2008/0126951 A1 | 5/2008 | Sood et al. |
| 2008/0133567 A1 | 6/2008 | Ames et al. |
| 2008/0140576 A1 | 6/2008 | Lewis et al. |
| 2008/0148398 A1 | 6/2008 | Mezack et al. |
| 2008/0155440 A1 | 6/2008 | Trevor et al. |
| 2008/0195417 A1 | 8/2008 | Surpin et al. |
| 2008/0195608 A1 | 8/2008 | Clover |
| 2008/0222038 A1 | 9/2008 | Eden et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288425 A1 | 11/2008 | Posse et al. |
| 2008/0301042 A1 | 12/2008 | Patzer |
| 2008/0301643 A1 | 12/2008 | Appleton et al. |
| 2008/0313132 A1 | 12/2008 | Hao et al. |
| 2009/0018940 A1 | 1/2009 | Wang et al. |
| 2009/0018996 A1 | 1/2009 | Hunt et al. |
| 2009/0024505 A1 | 1/2009 | Patel et al. |
| 2009/0027418 A1 | 1/2009 | Maru et al. |
| 2009/0030915 A1 | 1/2009 | Winter et al. |
| 2009/0044279 A1 | 2/2009 | Crawford et al. |
| 2009/0055251 A1 | 2/2009 | Shah et al. |
| 2009/0076845 A1 | 3/2009 | Bellin et al. |
| 2009/0082997 A1 | 3/2009 | Tokman et al. |
| 2009/0083184 A1 | 3/2009 | Eisen |
| 2009/0088964 A1 | 4/2009 | Schaaf et al. |
| 2009/0094166 A1 | 4/2009 | Aymeloglu et al. |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187546 A1 | 7/2009 | Whyte et al. |
| 2009/0187548 A1 | 7/2009 | Ji et al. |
| 2009/0192957 A1 | 7/2009 | Subramanian et al. |
| 2009/0222400 A1 | 9/2009 | Kupershmidt et al. |
| 2009/0222760 A1 | 9/2009 | Halverson et al. |
| 2009/0228365 A1 | 9/2009 | Tomchek et al. |
| 2009/0234720 A1 | 9/2009 | George et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0287470 A1 | 11/2009 | Farnsworth et al. |
| 2009/0287628 A1 | 11/2009 | Indeck et al. |
| 2009/0292626 A1 | 11/2009 | Oxford |
| 2009/0300589 A1 | 12/2009 | Watters et al. |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319891 A1 | 12/2009 | MacKinlay |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0077483 A1 | 3/2010 | Stolfo et al. |
| 2010/0094765 A1* | 4/2010 | Nandy .......... G06N 5/025 705/317 |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106611 A1 | 4/2010 | Paulsen et al. |
| 2010/0114887 A1 | 5/2010 | Conway et al. |
| 2010/0122152 A1 | 5/2010 | Chamberlain et al. |
| 2010/0125546 A1 | 5/2010 | Barrett et al. |
| 2010/0131457 A1 | 5/2010 | Heimendinger |
| 2010/0131502 A1 | 5/2010 | Fordham |
| 2010/0161735 A1 | 6/2010 | Sharma |
| 2010/0162176 A1 | 6/2010 | Dunton |
| 2010/0169192 A1 | 7/2010 | Zoldi et al. |
| 2010/0169237 A1 | 7/2010 | Howard et al. |
| 2010/0185691 A1 | 7/2010 | Irmak et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |

(56) References Cited

U.S. PATENT DOCUMENTS

| | | |
|---|---|---|
| 2011/0004626 A1 | 1/2011 | Naeymi-Rad et al. |
| 2011/0047159 A1 | 2/2011 | Baid et al. |
| 2011/0055074 A1 | 3/2011 | Chen et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0087519 A1 | 4/2011 | Fordyce, III et al. |
| 2011/0093327 A1 | 4/2011 | Fordyce, III et al. |
| 2011/0099133 A1 | 4/2011 | Chang et al. |
| 2011/0099628 A1 | 4/2011 | Lanxner et al. |
| 2011/0117878 A1 | 5/2011 | Barash et al. |
| 2011/0119100 A1 | 5/2011 | Ruhl et al. |
| 2011/0131122 A1 | 6/2011 | Griffin et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0167493 A1 | 7/2011 | Song et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0178842 A1 | 7/2011 | Rane et al. |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0218955 A1 | 9/2011 | Tang |
| 2011/0219450 A1 | 9/2011 | McDougal et al. |
| 2011/0225198 A1 | 9/2011 | Edwards et al. |
| 2011/0225586 A1 | 9/2011 | Bentley et al. |
| 2011/0231223 A1 | 9/2011 | Winters |
| 2011/0231305 A1 | 9/2011 | Winters |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0251951 A1 | 10/2011 | Kolkowitz |
| 2011/0258158 A1 | 10/2011 | Resende et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0291851 A1 | 12/2011 | Whisenant |
| 2011/0295649 A1 | 12/2011 | Fine |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084117 A1 | 4/2012 | Tavares et al. |
| 2012/0084135 A1 | 4/2012 | Nissan et al. |
| 2012/0084287 A1 | 4/2012 | Lakshminarayan et al. |
| 2012/0084866 A1 | 4/2012 | Stolfo |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0158585 A1 | 6/2012 | Ganti |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0173381 A1 | 7/2012 | Smith |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0208636 A1 | 8/2012 | Feige |
| 2012/0215784 A1 | 8/2012 | King et al. |
| 2012/0215898 A1 | 8/2012 | Shah et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0278249 A1 | 11/2012 | Duggal et al. |
| 2012/0290879 A1 | 11/2012 | Shibuya et al. |
| 2012/0296907 A1 | 11/2012 | Long et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2012/0323888 A1 | 12/2012 | Osann, Jr. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0016106 A1 | 1/2013 | Yip et al. |
| 2013/0018796 A1 | 1/2013 | Kolhatkar et al. |
| 2013/0024307 A1 | 1/2013 | Fuerstenberg et al. |
| 2013/0024339 A1 | 1/2013 | Choudhuri et al. |
| 2013/0046842 A1 | 2/2013 | Muntz et al. |
| 2013/0054306 A1 | 2/2013 | Bhalla |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0101159 A1 | 4/2013 | Chao et al. |
| 2013/0110746 A1 | 5/2013 | Ahn |
| 2013/0110822 A1 | 5/2013 | Ikeda et al. |
| 2013/0111320 A1 | 5/2013 | Campbell et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0160120 A1 | 6/2013 | Malaviya et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0211985 A1 | 8/2013 | Clark et al. |
| 2013/0224696 A1 | 8/2013 | Wolfe et al. |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0238664 A1 | 9/2013 | Hsu et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0262328 A1 | 10/2013 | Federgreen |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |

(56) References Cited

U.S. PATENT DOCUMENTS

| | | |
|---|---|---|
| 2013/0318594 A1 | 11/2013 | Hoy et al. |
| 2013/0325826 A1 | 12/2013 | Agarwal et al. |
| 2013/0339218 A1 | 12/2013 | Subramanian et al. |
| 2014/0006109 A1 | 1/2014 | Callioni et al. |
| 2014/0012724 A1 | 1/2014 | O'Leary et al. |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0058914 A1 | 2/2014 | Song et al. |
| 2014/0059038 A1 | 2/2014 | McPherson et al. |
| 2014/0068487 A1 | 3/2014 | Steiger et al. |
| 2014/0095273 A1 | 4/2014 | Tang et al. |
| 2014/0095363 A1 | 4/2014 | Caldwell |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149272 A1 | 5/2014 | Hirani et al. |
| 2014/0149436 A1 | 5/2014 | Bahrami et al. |
| 2014/0156484 A1 | 6/2014 | Chan et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0222521 A1 | 8/2014 | Chait |
| 2014/0222752 A1* | 8/2014 | Isman .............. G06F 11/3684 707/603 |
| 2014/0222793 A1 | 8/2014 | Sadkin et al. |
| 2014/0229554 A1 | 8/2014 | Grunin et al. |
| 2014/0267294 A1 | 9/2014 | Ma |
| 2014/0267295 A1 | 9/2014 | Sharma |
| 2014/0279824 A1 | 9/2014 | Tamayo |
| 2014/0310282 A1 | 10/2014 | Sprague et al. |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0358789 A1 | 12/2014 | Boding et al. |
| 2014/0358829 A1 | 12/2014 | Hurwitz |
| 2014/0366132 A1 | 12/2014 | Stiansen et al. |
| 2015/0019394 A1 | 1/2015 | Unser et al. |
| 2015/0046870 A1 | 2/2015 | Goldenberg et al. |
| 2015/0073929 A1 | 3/2015 | Psota et al. |
| 2015/0073954 A1 | 3/2015 | Braff |
| 2015/0089424 A1 | 3/2015 | Duffield et al. |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0134512 A1* | 5/2015 | Mueller ............ G06Q 20/4016 705/39 |
| 2015/0135256 A1 | 5/2015 | Hoy et al. |
| 2015/0161611 A1 | 6/2015 | Duke et al. |
| 2015/0178825 A1 | 6/2015 | Huerta |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0048937 A1 | 2/2016 | Mathura et al. |
| 2017/0147654 A1 | 5/2017 | Saperstein et al. |
| 2017/0221063 A1 | 8/2017 | Mathura et al. |

FOREIGN PATENT DOCUMENTS

| | | |
|---|---|---|
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014215621 | 2/2015 |
| EP | 1191463 | 3/2002 |
| EP | 1672527 | 6/2006 |
| EP | 2487610 | 8/2012 |
| EP | 2551799 | 1/2013 |
| EP | 2555153 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2889814 | 7/2015 |
| EP | 2891992 | 7/2015 |
| EP | 2892197 | 7/2015 |
| EP | 2911078 | 8/2015 |
| EP | 2963595 | 1/2016 |
| EP | 2985729 | 2/2016 |
| EP | 3142057 | 3/2017 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 2000/009529 | 2/2000 |
| WO | WO 2005/104736 | 11/2005 |
| WO | WO 2005/116851 | 12/2005 |
| WO | WO 2008/011728 | 1/2008 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |
| WO | WO 2013/126281 | 8/2013 |

OTHER PUBLICATIONS

"A First Look: Predicting Market Demand for Food Retail using a Huff Analysis," TRF Policy Solutions, Jul. 2012, pp. 30.

"A Quick Guide to UniProtKB Swiss-Prot & TrEMBL," Sep. 2011, pp. 2.

"A Word About Banks and the Laundering of Drug Money," Aug. 18, 2012, http://www.golemxiv.co.uk/2012/08/a-word-about-banks-and-the-laundering-of-drug-money/.

Acklen, Laura, "Absolute Beginner's Guide to Microsoft Word 2003," Dec. 24, 2003, pp. 15-18, 34-41, 308-316.

Alfred, Rayner "Summarizing Relational Data Using Semi-Supervised Genetic Algorithm-Based Clustering Techniques", Journal of Computer Science, 2010, vol. 6, No. 7, pp. 775-784.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Bluttman et al., "Excel Formulas and Functions for Dummies," 2005, Wiley Publishing, Inc., pp. 280, 284-286.

Boyce, Jim, "Microsoft Outlook 2010 Inside Out," Aug. 1, 2010, retrieved from the internet https://capdtron.files.wordpress.com/2013/01/outlook-2010-inside_out.pdf.

(56) References Cited

OTHER PUBLICATIONS

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Capptain—Pilot Your Apps, <http://www.capptain.com> Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chaudhuri et al., "An Overview of Business Intelligence Technology," Communications of the ACM, Aug. 2011, vol. 54, No. 8.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Cohn, et al., "Semi-supervised clustering with user feedback," Constrained Clustering: Advances in Algorithms, Theory, and Applications 4.1 (2003): 17-32.
Conner, Nancy, "Google Apps: The Missing Manual," May 1, 2008, pp. 15.
Countly Mobile Analytics, <http://count.ly/> Printed Jul. 18, 2013 in 9 pages.
Definition "Identify", downloaded Jan. 22, 2015, 1 page.
Definition "Overlay", downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Distimo—App Analytics, <http://www.distimo.com/app-analytics> Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
"The Fasta Program Package," fasta-36.3.4, Mar. 25, 2011, pp. 29.
Flurry Analytics, <http://www.flurry.com/> Printed Jul. 18, 2013 in 14 pages.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services", HiPC 2006, LNCS 4297, pp. 277-288, 2006.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Kontagent Mobile Analytics, <http://www.kontagent.com/> Printed Jul. 18, 2013 in 9 pages.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, <http://www.localytics.com/> Printed Jul. 18, 2013 in 12 pages.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Mixpanel—Mobile Analytics, <https://mixpanel.com/> Printed Jul. 18, 2013 in 13 pages.
Mizrachi, Ilene, "Chapter 1: GenBank: The Nuckeotide Sequence Database," The NCBI Handbook, Oct. 2002, pp. 1-14.
"Money Laundering Risks and E-Gaming: A European Overview and Assessment," 2009, http://www.cf.ac.uk/socsi/resources/Levi_Final_Money_Laundering_Risks_egaming.pdf.

(56) References Cited

OTHER PUBLICATIONS

Nierman, "Evaluating Structural Similarity in XML Documents", 6 pages, 2002.
Nolan et al., "MCARTA: A Malicious Code Automated Run-Time Analysis Framework," Homeland Security (HST) 2012 IEEE Conference on Technologies for, Nov. 13, 2012, pp. 13-17.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Open Web Analytics (OWA), <http://www.openwebanalytics.com/> Printed Jul. 19, 2013 in 5 pages.
Palmas et al., "An Edge-Bunding Layout for Interactive Parallel Coordinates" 2014 IEEE Pacific Visualization Symposium, pp. 57-64.
Perdisci et al., "Behavioral Clustering of HTTP-Based Malware and Signature Generation Using Malicious Network Traces," USENIX, Mar. 18, 2010, pp. 1-14.
Piwik—Free Web Analytics Software. <http://piwik.org/> Printed Jul. 19, 2013 in18 pages.
"Potential Money Laundering Warning Signs," snapshot taken 2003, https://web.archive.org/web/20030816090055/http:/finsolinc.com/ANTI-MONEY%20LAUNDERING%20TRAINING%20GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Rouse, Margaret, "OLAP Cube," <http://searchdatamanagement.techtarget.com/definition/OLAP-cube>, Apr. 28, 2012, pp. 16.
Shah, Chintan, "Periodic Connections to Control Server Offer New Way to Detect Botnets," Oct. 24, 2013 in 6 pages, <http://www.blogs.mcafee.com/mcafee-labs/periodic-links-to-control-server-offer-new-way-to-detect-botnets>.
Shi et al., "A Scalable Implementation of Malware Detection Based on Network Connection Behaviors," 2013 International Conference on Cyber-Enabled Distributed Computing Knowledge Discovery, IEEE, Oct. 10, 2013, pp. 59-66.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
StatCounter—Free Invisible Web Tracker, Hit Counter and Web Stats, <http://statcounter.com/> Printed Jul. 19, 2013 in 17 pages.
Symantec Corporation, "E-Security Begins with Sound Security Policies," Announcement Symantec, Jun. 14, 2001.
TestFlight—Beta Testing on the Fly, <http://testflightapp.com/> Printed Jul. 18, 2013 in 3 pages.
trak.io, <http://trak.io/> printed Jul. 18, 2013 in 3 pages.
Umagandhi et al., "Search Query Recommendations Using Hybrid User Profile with Query Logs," International Journal of Computer Applications, vol. 80, No. 10, Oct. 1, 2013, pp. 7-18.
UserMetrix, <http://usermetrix.com/android-analytics> printed Jul. 18, 2013 in 3 pages.
"Using Whois Based Geolocation and Google Maps API for Support Cybercrime Investigations," http://wseas.us/e-library/conferences/2013/Dubrovnik/TELECIRC/TELECIRC-32.pdf.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.
Wikipedia, "Federated Database System," Sep. 7, 2013, retrieved from the internet on Jan. 27, 2015 http://en.wikipedia.org/w/index.php?title=Federated_database_system&oldid=571954221.
Wikipedia, "Multimap," Jan. 1, 2013, https://en.wikipedia.org/w/index.php?title=Multimap&oldid=530800748.
Yang et al., "HTML Page Analysis Based on Visual Cues", A129, pp. 859-864, 2001.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/139,713 dated Jun. 12, 2015.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/264,445 dated May 14, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/479,863 dated Mar. 31, 2015.
Notice of Allowance for U.S. Appl. No. 14/486,991 dated May 1, 2015.
Notice of Allowance for U.S. Appl. No. 14/504,103 dated May 18, 2015.
Notice of Allowance for U.S. Appl. No. 14/552,336 dated Nov. 3, 2015.
Notice of Allowance for U.S. Appl. No. 14/616,080 dated Apr. 2, 2015.
Notice of Allowance for U.S. Appl. No. 14/746,671 dated Jan. 21, 2016.
Notice of Allowance for U.S. Appl. No. 14/923,364 dated May 6, 2016.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14159535.5 dated May 22, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.

(56) References Cited

OTHER PUBLICATIONS

Official Communication for European Patent Application No. 14186225.0 dated Feb. 13, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14199182.8 dated Mar. 13, 2015.
Official Communication for European Patent Application No. 14200246.8 dated May 29, 2015.
Official Communication for European Patent Application No. 14200298.9 dated May 13, 2015.
Official Communication for European Patent Application No. 15155845.9 dated Oct. 6, 2015.
Official Communication for European Patent Application No. 15175151.8 dated Nov. 25, 2015.
Official Communication for European Patent Application No. 15180515.7 dated Jun. 1, 2017.
Official Communication for European Patent Application No. 15180515.7 dated Dec. 14, 2015.
Official Communication for European Patent Application No. 15181419.1 dated Sep. 29, 2015.
Official Communication for European Patent Application No. 15184764.7 dated Dec. 14, 2015.
Official Communication for European Patent Application No. 16185668.7 dated Feb. 9, 2017.
Official Communication for Great Britain Patent Application No. 1404457.2 dated Aug. 14, 2014.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012438 dated Sep. 21, 2015.
Official Communication for Netherlands Patent Application No. 2013306 dated Apr. 24, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 13/247,987 dated Apr. 2, 2015.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Mar. 30, 2016.
Official Communication for U.S. Appl. No. 13/827,491 dated Oct. 9, 2015.
Official Communication for U.S. Appl. No. 13/831,791 dated Mar. 4, 2015.
Official Communication for U.S. Appl. No. 14/141,252 dated Oct. 8, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/251,485 dated Oct. 1, 2015.
Official Communication for U.S. Appl. No. 14/251,485 dated May 16, 2017.
Official Communication for U.S. Appl. No. 14/251,485 dated Nov. 7, 2016.

(56) References Cited

OTHER PUBLICATIONS

Official Communication for U.S. Appl. No. 14/264,445 dated Apr. 17, 2015.
Official Communication for U.S. Appl. No. 14/268,964 dated Sep. 3, 2014.
Official Communication for U.S. Appl. No. 14/278,963 dated Jan. 30, 2015.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Sep. 9, 2014.
Official Communication for U.S. Appl. No. 14/319,161 dated Jan. 23, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/473,552 dated Feb. 24, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/486,991 dated Mar. 10, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/516,386 dated Feb. 24, 2016.
Official Communication for U.S. Appl. No. 14/518,757 dated Apr. 2, 2015.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/631,633 dated Sep. 10, 2015.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/639,606 dated Apr. 5, 2016.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/726,353 dated Sep. 10, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/842,734 dated Nov. 19, 2015.
Official Communication for U.S. Appl. No. 14/923,374 dated May 23, 2016.
Official Communication for U.S. Appl. No. 14/923,374 dated Feb. 9, 2016.
Official Communication for U.S. Appl. No. 15/017,324 dated Apr. 22, 2016.
Notice of Allowance for U.S. Appl. No. 15/336,078 dated Oct. 18, 2017.

* cited by examiner

| TransID | AccountID | StatementID | TranstypeID | Description | PostDate | TransAmt | TransRegID | LastUpdate |
|---|---|---|---|---|---|---|---|---|
| 0001 | 123456 | null | 1 | Grocery Store | 4/1/15 11AM | -60.00 | 987654 | 4/1/15 11AM |
| 0002 | 123789 | null | 2 | Payroll | 4/2/15 10AM | 62.11 | 987643 | 4/2/15 10AM |
| 0003 | 123456 | null | 15 | Donut Shop | 4/2/15 2PM | -7.09 | 987654 | 4/2/15 2PM |
| 0007 | 145558 | null | 8 | Pharmacy | 4/4/15 7AM | -143.57 | 988145 | 4/4/15 7AM |
| 0010 | 145558 | null | 6 | Hardware Store | 4/4/15 9AM | -38.65 | 988145 | 4/4/15 9AM |

FIG. 2

| Validation Day | Missing Blocks | Total Missing Time | IsValid |
|---|---|---|---|
| 3/30/15 | [ ] | 0 | true |
| 3/31/15 | [ ] | 0 | true |
| 4/1/15 | [ ] | 0 | true |
| 4/2/15 | [360, 364, 365, 366, 370] | 5 | true |
| 4/3/15 | [ ] | 0 | true |
| 4/4/15 | [ ] | 0 | true |
| 4/5/15 | [ ] | 0 | true |

FIG. 3

| TransID | AggregationID | TranstypeID | Description | PostDate | TransAmt | AccountID |
|---|---|---|---|---|---|---|
| 0001 | SSN-123456789 | ATM Withdrawal | Grocery Store | 4/1/15 11AM | -60.00 | 123456 |
| 0002 | SSN-234567890 | Funding Deposit | Payroll | 4/2/15 10AM | 62.11 | 123789 |
| 0003 | SSN-123456789 | Purchase | Donut Shop | 4/2/15 2PM | -7.09 | 123456 |
| 0007 | SSN-987654321 | Purchase | Pharmacy | 4/4/15 7AM | -143.57 | 145558 |
| 0010 | SSN-987654321 | Purchase | Hardware Store | 4/4/15 9AM | -38.65 | 145558 |

| TransID | TransReqID | AggregationID | TranstypeID | Description | PostDate | TransAmt | AccountID |
|---|---|---|---|---|---|---|---|
| 0001 | 987654 | SSN-123456789 | ATM Withdrawal | Grocery Store | 4/1/15 11AM | -60.00 | 123456 |
| 0002 | 987643 | SSN-234567890 | Funding Deposit | Payroll | 4/2/15 10AM | 62.11 | 123789 |
| 0003 | 987654 | SSN-123456789 | Purchase | Donut Shop | 4/2/15 2PM | -7.09 | 123456 |
| 0007 | 988145 | SSN-987654321 | Purchase | Pharmacy | 4/4/15 7AM | -143.57 | 145558 |
| 0010 | 988145 | SSN-987654321 | Purchase | Hardware Store | 4/4/15 9AM | -38.65 | 145558 |

FIG. 6F

CASH OUT – SSN 123456789 – July 2, 2015 to July 4, 2015

*Triggered by CASH OUT*
- Funding Percentage during April, 2015: 100.00%
- Funding Percentage during May 2015: 100.00%
- Funding Percentage during June 2015: 100.00%
- Funding Percentage during July 2015: N/A
- Flagged Amount: $14,239.00

ASSIGNED TO
John Doe

WATCHED BY
Jane Doe

Take Action ▾

Export ▾

Account Info | Personal Info | Notes

Add a note...

Submit

FIG. 6I

| AggregationID | Flagged Month | Flag Date | Conclusions | Priority | Rule | Rule ID |
|---|---|---|---|---|---|---|
| SSN-123456789 | July 2015 | 2015/07/02-2015/07/04 | Flagged amount - 14239.00 | High | Cash Out | Cash Out SSN-123456789-2015/07/02-2015/07/04 |
| SSN-123456789 | July 2015 | 2015/07/09-2015/07/11 | Flagged amount - 15167.00 | High | Cash Out | Cash Out SSN-123456789-2015/07/09-2015/07/11 |
| SSN-123456789 | July 2015 | 2015/07/13-2015/07/15 | Flagged amount - 13999.00 | High | Cash Out | Cash Out SSN-123456789-2015/07/13-2015/07/15 |
| SSN-123456789 | July 2015 | 2015/07/21-2015/07/23 | Flagged amount - 11435.00 | High | Cash Out | Cash Out SSN-123456789-2015/07/21-2015/07/23 |
| SSN-123456789 | July 2015 | 2015/07/29-2015/07/31 | Flagged amount - 10371.00 | High | Cash Out | Cash Out SSN-123456789-2015/07/29-2015/07/31 |

FIG. 7

MALICIOUS ACTIVITY DETECTION SYSTEM CAPABLE OF EFFICIENTLY PROCESSING DATA ACCESSED FROM DATABASES AND GENERATING ALERTS FOR DISPLAY IN INTERACTIVE USER INTERFACES

CROSS-REFERENCE TO RELATED APPLICATIONS

This application is a continuation of U.S. patent application Ser. No. 15/336,078, entitled "MALICIOUS ACTIVITY DETECTION SYSTEM CAPABLE OF EFFICIENTLY PROCESSING DATA ACCESSED FROM DATABASES AND GENERATING ALERTS FOR DISPLAY IN INTERACTIVE USER INTERFACES" and filed on Oct. 27, 2016, which is a continuation of U.S. patent application Ser. No. 15/017,324, entitled "MALICIOUS ACTIVITY DETECTION SYSTEM CAPABLE OF EFFICIENTLY PROCESSING DATA ACCESSED FROM DATABASES AND GENERATING ALERTS FOR DISPLAY IN INTERACTIVE USER INTERFACES" and filed on Feb. 5, 2016, which claims priority under 35 U.S.C. § 119(e) to U.S. Provisional Application No. 62/211,520, entitled "FRAUD DETECTION SYSTEM CAPABLE OF EFFICIENTLY PROCESSING DATA ACCESSED FROM DATABASES AND GENERATING ALERTS FOR DISPLAY IN INTERACTIVE USER INTERFACES" and filed on Aug. 28, 2015, each of which are hereby incorporated by reference herein in their entireties.

TECHNICAL FIELD

The present disclosure relates to systems and techniques for data integration, analysis, and visualization.

BACKGROUND

Prepaid cards or cash cards are cards in which a user may load money for later withdrawal. For example, a user may load money onto a prepaid card and then later use the prepaid card to make a purchase. By law, the prepaid cards are generally regulated like regular bank accounts. The issuers of the prepaid cards are in charge of making sure transactions associated with the prepaid cards comply with the relevant regulations.

If transactions associated with a prepaid card do not meet the relevant regulations, the issuer of the prepaid card must submit a report. For example, the issuer may be required to submit a report if the transactions indicate that fraud could be taking place. The prepaid cards are often linked to the user via some identifier that uniquely identifies the user, so the report may include such information to assist the issuer and/or a federal agency in taking further action, if necessary.

SUMMARY

The systems, methods, and devices described herein each have several aspects, no single one of which is solely responsible for its desirable attributes. Without limiting the scope of this disclosure, several non-limiting features will now be discussed briefly.

Issuers often store transaction data from prepaid cards in a plurality of databases. For example, one database may include transaction data that identifies an amount that was deposited or withdrawn on a card and a time and location where the transaction occurred, another database may include a description of the transaction and an identifier that identifies the user of the prepaid card, and so on. In some cases, to determine whether transactions comply with the relevant regulations, data from multiple databases may need to be analyzed. Typically, each individual database includes a large amount of uncompressed data (e.g., on the order of hundreds of gigabytes), so it is nearly impossible for a human fraud analyst to find all data that may be relevant to a particular regulation and/or to identify patterns that may indicate a regulation has been violated. The analysis could instead be automated. To perform the analysis, the data from the different databases would have to be combined into a single database, such as via a join table operation. However, because each individual database may include a large amount of uncompressed data, join operations typically implemented by traditional databases may be difficult to run. Furthermore, once the analysis is performed, a mechanism may need to be implemented so that detected inconsistencies between the transaction data and regulations can be brought to the fraud analyst's attention.

Accordingly, embodiments of the present disclosure relate to a system that retrieves raw transaction data from issuers, reorganizes the raw transaction data, analyzes the reorganized data to determine whether the relevant regulations have been complied with, and generates alerts to notify fraud analysts of possible regulation violations or the occurrence of possible risky or malicious behavior. For example, the raw transaction data may be included in a plurality of tables. The system may join one or more tables to reorganize the transaction data using several filtering techniques to reduce the amount of data being joined and the processor load required to perform the join operation. Once the transaction data is reorganized using the join operation, the system may run one or more rules to analyze the reorganized transaction data. Each rule may be associated with a regulation that governs the use of prepaid cards or a general category of risky or malicious behavior (e.g., behavior not associated with a specific regulation, but that nonetheless may indicate that fraud or other malicious activity is taking place). The rules may be generated such that duplicate violations are ignored and/or machine learning techniques are used to improve the function of the rule over time. If any of the rules indicate that a regulation may be violated or that risky behavior is occurring, the system may generate an alert for display to a fraud analyst in an interactive user interface. The interactive user interface may allow the fraud analyst to view additional details regarding alerts, organize alerts, filter alerts, and/or take further actions related to the alerts. Thus, the system may be able to efficiently allow prepaid card issuers to identify regulation violations or risky behavior and take appropriate action.

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a fraud analyst user.

Further, the interactive and dynamic user interfaces described herein are enabled by innovations in efficient interactions between the user interfaces and underlying systems and components. For example, disclosed herein are improved methods of merging data stored in different tables and/or databases, automatic and dynamic execution of complex rules in response to the successful data merges, automatic interaction among various components and processes of the system, and/or automatic and dynamic updating of the user interfaces. The interactions and presentation of data via the interactive user interfaces described herein may accordingly provide cognitive and ergonomic efficiencies and advantages over previous systems.

Advantageously, according to various embodiments, the disclosed techniques provide a more effective starting point and user interface for an investigation of potentially fraudulent activity. A fraud analyst may be able to start an investigation by viewing a group of identified alerts organized by user, country of origin, violated regulation, identified risky behavior, and/or the like instead of by parsing through a large amount of data (e.g., on the order of hundreds of gigabtyes) to identify a transaction or sequence of transactions that may indicate a regulation is violated or that risky behavior is occurring, which may reduce the amount of time and effort required to perform the investigation. The disclosed techniques may also, according to various embodiments, provide a prioritization of alerts (e.g., based on which violations require immediate attention and which violations do not require immediate attention). For example, the fraud analyst may also be able to start the investigation from a high priority group of alerts, which may allow the fraud analyst to focus on the most important investigations, and may quickly evaluate that group of alerts based on the efficient user interface generated by the system. In each case, the processing and memory requirements of such an investigation may be significantly reduced due to the efficient merging of data, the running of various rules and the generation of alerts and related data.

One aspect of the disclosure provides a computing system configured to process a large amount of dynamically updating data. The computing system comprises a database storing a first table and a second table, wherein the first table comprises a first column header, a second column header, and first data corresponding to the first column header or the second column header, and wherein the second table comprises the first column header, a third column header, and second data corresponding to the first column header or the third column header; a computer processor; and a computer readable storage medium storing program instructions configured for execution by the computer processor in order to cause the computing system to: retrieve the first table and the second table from the database, identify that the first column header is included in the first table and the second table, execute a join operation to generate a third table using the first column header as a join key, wherein the third table comprises the first column header, the second column header, the third column header, the first data, and the second data, select a first rule from a plurality of rules, wherein the first rule is associated with a behavior, run the first rule on the third table to determine whether the behavior regulation is risky, generate an alert in response to a determination that the behavior is risky, and transmit the alert for display in an interactive user interface.

The computing system of the preceding paragraph can have any sub-combination of the following features: where the second table further comprises a fourth column header, and wherein the program instructions are further configured to cause the computing system to: determine that the first rule does not use data associated with the fourth column header to determine whether the behavior is risky, and remove the fourth column from the second table prior to executing the join operation; where the first data comprises a first subset of data and a second subset of data, and where the program instructions are further configured to cause the computing system to: determine that the first rule does not use the second subset of data to determine whether the behavior is risky, and remove the second subset of data from the first data prior to executing the join operation; where the first table comprises a first row that includes a first subset of the first data and a second row that includes a second subset of the first data, and wherein the program instructions are further configured to cause the computing system to: determine that the first subset of the first data is the same as the second subset of the first data, and remove the second row from the first table prior to executing the join operation; where the interactive user interface comprises a button that allows a user to take an action associated with the displayed alert; where the program instructions are further configured to cause the computing system to: receive, from the user, a selection of the button, update the interactive user interface to display a plurality of actions in response to receiving the selection, receive, from the user, a second selection of a first action in the plurality of actions, and generate a report in response to receiving the second selection; where the program instructions are further configured to cause the computing system to: use a clustering process to separate the first data and the second data into a plurality of clusters, identify a subset of the first data or the second data that fall outside of a first cluster in the plurality of clusters by at least a threshold value, and generate an alert for each of the items in the subset of the first data or the second data; where the program instructions are further configured to cause the computing system to update the clustering process based on actions taken by a user with regard to the generated alerts for each of the items in the subset of the first data or the second data; where the first rule is a cash out rule; where the program instructions are further configured to cause the computing system to: identify, based on an analysis of the first data and the second data, that a first user withdrew no money on a first day, no money on a second day, a first amount of money on a third day, no money on a fourth day, and no money on a fourth day, no money on a wherein a withdrawal of the first amount of money causes the computing system to determine that the behavior is risky, and generate the alert such that the alert corresponds with the first day, the second day, and the third day, does not correspond with the second day, the third day, and the fourth day, and does not correspond with the third day, the fourth day, and the fifth day; where the database further stores historical data, and wherein the program instructions are further configured to cause the computing system to: retrieve the historical data from the database, wherein running the first rule on the historical data causes the computing system to determine that the behavior is risky, merging the first data and the historical data, running the first rule on the merged first data and historical data, determining whether the behavior is risky, and determining that the first data is valid in response to a determination that the behavior is risky; where the database receives data from an issuer database in periodic intervals, and wherein the program instructions are further configured to cause the computing system to: select the first table, where a first subset of the first data is expected to be received at a first time and a second subset of the first data is expected to be received at a second time, determine that the second subset of the first data was not received at the second time, and generate a notification for display in the interactive user interface, wherein the notification instructs a user to retrieve the second subset of the first data; where the first rule is one of a cash out rule, a cash in rule, a sustained cash rule, a behavior outlier rule, a cross-border cash rule, a foreign cash out rule, a high risk countries rule, an external funding rule, a tax refund rule, a card-to-card transfer rule, a watch list rule, or a manual trigger rule; where the alert comprises information identifying a user associated with a prepaid card that caused the computing system to determine that the behavior is risky; where the program instructions are further configured to cause the computing system to determine that the behavior is risky in response to a determination that a first regulation is violated; and where the program instructions are further configured to cause the computing system to transmit the alert via one of an email, a push notification, or a text message.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

BRIEF DESCRIPTION OF THE DRAWINGS

FIG. 2 illustrates a user interface displaying a table of raw transaction data collected by an issuer of FIG. 1.

FIG. 3 illustrates a user interface displaying a table depicting the results of the validation performed by the transaction data server of FIG. 1.

FIG. 4 illustrates another user interface displaying a table of raw transaction data collected by an issuer of FIG. 1.

FIG. 5 illustrates a user interface displaying a join table formed from a join operation performed on the table of FIG. 2 and the table of FIG. 4.

FIGS. 6A-6M illustrate a user interface displaying generated alerts.

FIG. 7 illustrates a user interface displaying a table view of generated alerts.

DETAILED DESCRIPTION OF SPECIFIC EMBODIMENTS

Overview

Figure 1:
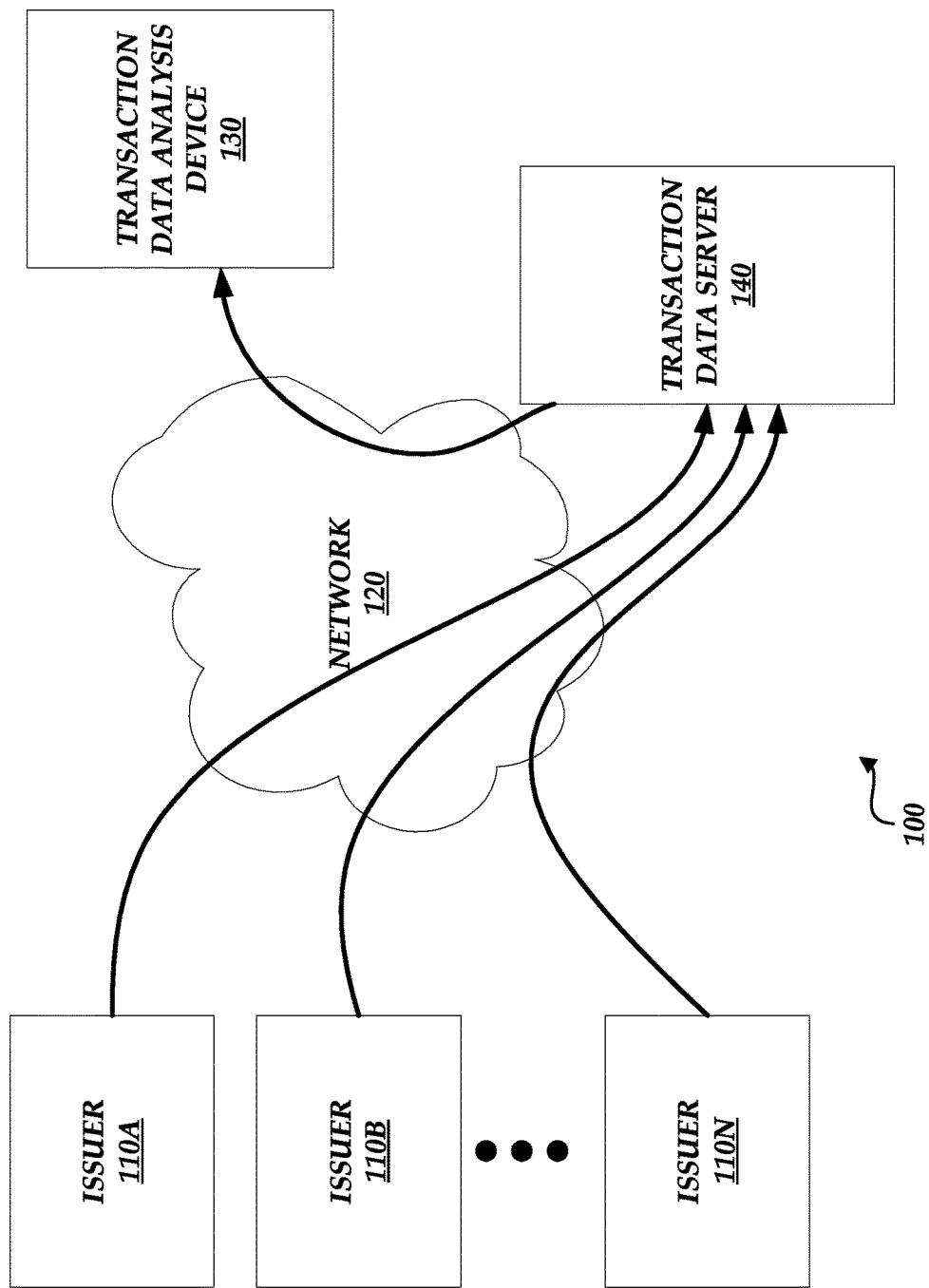
FIG. 1 illustrates a block diagram of a system for collecting, organizing, and analyzing transaction data.

As described above, transactions associated with a prepaid card may not meet regulations, such as regulations put in place to identify and/or prevent fraudulent activity. Such regulations can include U.S. federal regulations and/or statutes (e.g., the CARD Act, the Dodd-Frank Act, Electronic Funds Transfer Act, Federal Reserve regulations, etc.), individual state regulations and/or statutes, internal banking regulations, regulations or rules issued by executive agencies, and/or other similar rules or laws. In particular, prepaid cards have been used as a vehicle to store funds received via deceptive or fraudulent schemes and transactions associated with a prepaid card that do not meet the relevant regulations may indicate such activity. For example, scammers have intimidated consumers (e.g., by posing as Internal Revenue Service agents, utility companies, etc.), demanding that victims wire unpaid funds to a prepaid card or risk being arrested, losing service, and/or the like. As another example, scammers have filed false tax returns that result in a tax refund, and set the refund to be wired to a prepaid card rather than an account owned by the actual taxpayer. Thus, prepaid cards can be used to deprive consumers and/or businesses of millions to billions of dollars.

In an effort to combat such malicious activity, issuers (e.g., entities that issue prepaid cards) are required to submit a report, such as a currency transaction report (CTR) or a suspicious activity report (SAR), if the transactions associated with a prepaid card indicate that fraud (e.g., money laundering, tax fraud, etc.) could be taking place. Transactions associated with a prepaid card may indicate that fraud could be taking place if the transactions (or even a single transaction) violate one or more regulations that govern the use of prepaid cards.

Issuers often store transaction data from prepaid cards in a plurality of databases. For example, one database may include transaction data that identifies an amount that was deposited or withdrawn on a card and a time and location where the transaction occurred, another database may include a description of the transaction and an identifier that identifies the user of the prepaid card, and so on. In some cases, to determine whether transactions comply with the relevant regulations, data from multiple databases or data from multiple tables within one or more databases may need to be analyzed. Typically, each individual database includes a large amount of uncompressed data (e.g., on the order of hundreds of gigabytes), so it is nearly impossible for a human fraud analyst to find all data that may be relevant to a particular regulation and/or to identify patterns that may indicate that risky behavior is occurring (e.g., a regulation has been violated). Thus, relying on a human to perform the fraud analysis may not be adequate to identify and/or prevent the harm occurring to consumers and/or businesses.

The analysis could instead be automated. To perform the analysis, the data from the different databases would have to be combined into a single database, such as via a join or merge table operation. However, because each individual database may include a large amount of uncompressed data, join or merge operations typically implemented by traditional databases may be difficult to run because the join operations cannot process such a large amount of information. Furthermore, once the analysis is performed, a mechanism may need to be implemented so that detected inconsistencies between the transaction data and regulations can be brought to the fraud analyst's attention for further action.

Accordingly, embodiments of the present disclosure relate to a system that retrieves raw transaction data from issuers, reorganizes the raw transaction data, analyzes the reorganized data to determine whether the relevant regulations have been complied with and/or whether risky or malicious behavior is occurring (which can include the violation of one or more regulations), and generates alerts to notify fraud analysts of possible regulation violations and/or the occurrence of possible risky or malicious behavior. For example, the raw transaction data may be included in a plurality of tables stored within one or more databases. The system may join one or more tables to reorganize the transaction data using several filtering techniques to reduce the processor load required to perform the join operation. Once the transaction data is reorganized using the join operation, the system may run one or more rules to analyze the reorganized transaction data. Each rule may be associated with a regulation that governs the use of prepaid cards or a general category of risky or malicious behavior (e.g., behavior not associated with a specific regulation, but that nonetheless may indicate that fraud or other malicious activity is taking place). The rules may be generated such that duplicate violations are ignored and/or machine learning techniques are used to improve the function of the rule over time. If any of the rules indicate that a regulation may be violated or that risky behavior is occurring, the system may generate an alert for display to a fraud analyst in an interactive user interface. The interactive user interface may allow the fraud analyst to view additional details regarding alerts, organize alerts, filter alerts, and/or take further actions related to the alerts. Thus, the system may be able to efficiently allow prepaid card issuers to identify regulation violations or risky behavior and take appropriate action. The system is described in greater detail below with respect to FIGS. 1-9.

Transaction Data Collection and Analysis System Overview

FIG. 1 illustrates a block diagram of a system 100 for collecting, organizing, and analyzing transaction data. The system 100 comprises one or more issuers 110, a transaction data analysis device 130, a transaction data server 140, and a network 120.

In the embodiment illustrated in FIG. 1, the one or more issuers 110 (e.g., banks, credit card companies, etc.), which may be implemented by one or more first physical computing devices, are communicatively connected to the transaction data server 140, which may be implemented by one or more second physical computing devices, over the network 120. Similarly, the transaction data analysis device 130 (e.g., operated by a fraud analyst at an entity, such as the issuer or a third party) may be implemented by one or more third physical computing devices and may be communicatively connected to the transaction data server 140 over the network 120. The transaction data server 140 can be operated by the issuer or can be operated by a third party (e.g., a company that contracts with an issuer). In some embodiments, each such physical computing device may be implemented as a computer system including some or all of the components illustrated in the example computing system 1000 of FIG. 10. For example, the one or more issuers 110, the transaction data analysis device 130, and/or the transaction data server 140 may be implemented in a computer system as a set of program instructions recorded on a machine-readable storage medium.

The one or more issuers 110 represent devices operated by prepaid card issuers (e.g., banks, credit card companies, etc.). Users may obtain prepaid cards from these prepaid card issuers and load money onto the cards for later use. Each time a transaction (e.g., a deposit, a withdrawal, a purchase, a fee, etc.) takes place using a prepaid card, the transaction is tracked by the issuer 110 associated with the prepaid card. Details of the transaction may be stored in one or more tables and the tables may be stored in one or more databases associated with the issuer 110 (not shown). At preset times or at the request of a fraud analyst, the issuers 110A-N transmit the tables to the transaction data server 140 for processing and analysis.

The transaction data analysis device 130 represents a device operated by an issuer or third party that allows a fraud analyst to analyze transaction data for a plurality of prepaid cards and view alerts generated by the transaction data server 140. For example, the transaction data analysis device 130 has a display that shows an interactive graphical user interface (GUI), where the interactive GUI allows the fraud analyst to view additional details regarding alerts, organize alerts, filter alerts, and/or take further actions related to the alerts. In an embodiment, the transaction data analysis device 130 includes GUI logic. The GUI logic may be a set of program instructions configured for execution by one or more computer processors of the transaction data analysis device 130, which are operable to receive user input and to display a graphical representation of transaction data and/or alerts using the approaches described herein. The GUI logic may be operable to receive user input from, and display a graphical representation of the claims, in a GUI that is provided on a display (not shown) of the transaction data analysis device 130 and/or another computing device that is in communication with the transaction data analysis device 130.

The transaction data server 140 may be implemented as a special-purpose computer system having logical elements. In an embodiment, the logical elements may comprise program instructions recorded on one or more machine-readable storage media. Alternatively, the logical elements may be implemented in hardware, firmware, or a combination thereof.

When executed by one or more processors of the computer system, logic in the transaction data server 140 is operable to receive, store, reorganize, validate, and/or analyze transaction data according to the techniques described herein. The logic in the transaction data server 140 is also operable to run rules on the transaction data to generate alerts for viewing by the fraud analyst according to the techniques described herein. In one embodiment, the transaction data analysis device 130 and/or the transaction data server 140 may be implemented in a Java Virtual Machine (JVM) that is executing in a distributed or non-distributed computer system. In other embodiments, the transaction data analysis device 130 and/or the transaction data server 140 may be implemented as a combination of programming instructions written in any programming language (e.g. C++ or Visual Basic) and hardware components (e.g., memory, CPU time) that have been allocated for executing the program instructions.

In an embodiment, the network 120 includes any communications network, such as the Internet. The network 120 may be a wired network, a wireless network, or a combination of the two. For example, network 120 may be a local area network (LAN) and/or a wireless area network (WAN).

Transaction Data Tables and Join Operations

FIG. 2 illustrates a user interface 200 displaying a table 212 of raw transaction data collected by an issuer 110A-N. For example, the raw transaction data may include raw transaction data collected by the issuer 110A-N from one or more prepaid cards managed by the issuer 110A-N. The raw transaction data and/or a schema related to the raw transaction data may be transmitted to the transaction data server 140. Using the schema, the transaction data server 140 may generate various columns, associate the raw transaction data with one or more of the generated columns, and store such information (e.g., in a Hadoop Distributed File System (HDFS)) to generate the table 212 (and/or other tables). For example, the transaction data server 140 may receive the information from the issuers 110A-N and use the schema and the raw transaction data to generate the headers of the columns using the data pipeline system described in U.S. patent application Ser. No. 14/533,433, titled "HISTORY PRESERVING DATA PIPELINE SYSTEM AND METHOD" and filed on Nov. 5, 2014, which is hereby incorporated herein by reference in its entirety.

As illustrated in FIG. 2, the interface 200 includes a window 210 that includes the table 212. The table 212 includes the various columns and rows of transaction data. For example, the columns may include a transaction identifier (TransID) column, an account identifier (AccountID) column (e.g., an identifier that uniquely identifies a user), a transaction type identifier (TranstypeID) column, a description column, a transaction postdate (PostDate) column, a transaction amount (TransAmt) column, a transaction requirement identifier (TransReqID), and a time the transaction occurred (LastUpdate) column. While specific columns are depicted in the table 212, this is not meant to be limiting. The table 212 may include any number or type of column related to a transaction.

The user interface 200 may be displayed on the transaction data analysis device 130, which is in communication with the transaction data server 140. Within the user interface 200, the fraud analyst may be able to download the table 212 locally to the transaction data analysis device 130 by selecting download button 215. The fraud analyst may also be to sort the transaction data by column or by another means using sort button 220.

Before, after, and/or during the generation of the table 212 (and other tables), the transaction data server 140 may validate the raw transaction data. For example, the transaction data server 140 may expect to receive raw transaction data from the issuers 110A-N in regular intervals (e.g., every minute, every 15 minutes, every hour, etc.). The transaction data server 140 may parse the received raw transaction data and determine which data, if any, is missing or corrupted.

FIG. 3 illustrates a user interface 300 displaying a table 312 depicting the results of the validation performed by the transaction data server 140. As illustrated in FIG. 3, a window 310 includes the table 312. The table 312 includes a validation day column, a missing blocks column, a total missing time column, and an isValid column. The validation day column may indicate a day that a validation test was run by the transaction data server 140. The missing blocks column may identify specific times on the corresponding validation day in which raw transaction data is missing. For example, the fourth row in the table 312 indicates that there are 5 times in which raw transaction data is missing. The times may be represented as an absolute time (e.g., GMT time) or a number of seconds from a set time (e.g., a number of minutes since midnight of the validation day). The total missing time column may indicate the number of missing blocks on a given validation day. The isValid column may indicate whether any transaction data corresponding to the validation day is corrupted (e.g., with "true" meaning that no transaction data is corrupted).

If any transaction data is missing or corrupted, the user interface 300 may generate a notification to alert the fraud analyst of the error. The fraud analyst may then be able to request the missing transaction data or a replacement for the corrupted transaction data.

In further embodiments, prior to performing the join operations described herein, the transaction data server 140 performs a pre-processing step to further validate the transaction data. For example, the transaction data server 140 may store historical transaction data that has been validated at a previous time. The historical transaction data may be merged with a portion of the received raw transaction data and the transaction data server 140 may run one or more rules (described below) on the merged transaction data to ensure that the results are as expected (e.g., a known alert is generated). The pre-processing step may be run at regular intervals (e.g., daily) to ensure the transaction data is validated. If the transaction data is not validated, the transaction data server 140 can provide a notification to the fraud analyst and/or automatically correct an identified error. The pre-processing step may catch errors, such as off-by-1 errors, that are caused by a change in the format or schema of the raw transaction data (e.g., by the issuers 110A-N).

FIG. 4 illustrates another user interface 400 displaying a table 412 of raw transaction data collected by an issuer 110A-N. As described herein, the transaction data server 140 may perform join operations to merge data from one or more tables. As illustrated in FIG. 4, the table 412 includes different columns (and thus different transaction data) than found in the table 212. For example, the table 412 includes an aggregation identifier (AggregationID) column that indicates another identifier that uniquely identifies a user (e.g., via a social security number). In some cases, data found in table 212 (and not in table 412) and data found in table 412 (and not in table 212) may be joined such that the transaction data server 140 can properly run one or more of the rules. Likewise, the transaction data server 140 may join data from other tables (not shown) into a single table or multiple tables such that some or all of the rules can be run.

FIG. 5 illustrates a user interface 500 displaying a join table 512 formed from a join operation performed on the table 212 and the table 414. The join table 512 may be a new table or a modification of the table 212 or the table 414. The transaction data server 140 may further identify other columns or transaction data in other tables previously generated by the transaction data server 140 (not shown) and join these columns and/or transaction data with the information in the join table 512. For example, the transaction data server 140 may identify other columns or transaction data based on any additional data that may be necessary to run some or all of the rules. Alternatively or in addition, the transaction data server 140 may separately join transaction data from other tables (not shown) to form one or more other join tables. The other join tables may include different data than is present in the join table 512, and thus the transaction data server 140 may run separate rules on the data in the join table 512 and on the data in the other join tables.

The transaction data server 140 may use several techniques not typically performed during join operations to improve the speed and efficiency of the join operation and to ensure the join operation can be performed even when a large amount of transaction data (e.g., on the order of hundreds of gigabytes) is involved in the join operation (by, for example, reducing the amount of transaction data that is actually joined). For example, in some embodiments the transaction data server 140 identifies a column that is present in each of the tables involved in the join operation (e.g., such as the TransID column in the table 212 and the table 412) and uses the column as the join key. Some columns in the tables involved in the join operation may not be necessary, however. For example, the TransReqID information may not be necessary in order to properly run the rules. Thus, before performing the join operation, the data transaction server 140 may drop columns (and the transaction data corresponding to the dropped columns) from the tables such that the dropped columns are not included in the join table 512. Likewise, certain transactions may not be relevant to any of the rules. For example, withdrawal transactional data may be important to determine whether one or more regulations have been satisfied, but deposit transactional data may not be important to these determinations. Thus, before performing the join operation, the data transaction server 140 can parse each of the tables involved in the join operation and remove entries related to such irrelevant transactions. Furthermore, before performing the join operation, the data transaction server 140 can run a deduplication operation on each table involved in the join operation to remove any duplicate entries in such tables. In an embodiment, the TransID, which is a unique identifier for each transaction, may be used by the data transaction server 140 to determine whether each of the transactions in a table are unique or whether there are duplicates in the table. These techniques may help reduce the size of the raw transaction data, thereby reducing the processor load of the transaction data server 140 when performing the join operation(s).

Rules

As described above, the transaction data server 140 may run one or more rules on the join table 512 and/or other generated join tables to assess whether the relevant regulations have been complied with, whether generally risky behavior is occurring, and/or to determine whether further action may be necessary. If a rule is triggered, the transaction data server 140 may generate an alert. As an example, the rules may include a cash out rule, a cash in rule, a sustained cash rule, a behavior outlier rule, a cross-border cash rule, a foreign cash out rule, a high risk countries rule, an external funding rule, a tax refund rule, a card-to-card transfer rule, a watch list rule, and/or a manual trigger rule.

The cash out rule may monitor for one or more cash withdrawal transactions over a single-day or multi-day period (e.g., a one-day period, a three-day period, etc.) that collectively exceed a threshold value (e.g., a monetary value). In an embodiment, the transaction data server 140 groups transaction data from the join table(s) by the AggregationID (e.g., social security number) such that transactions associated with a single user can be analyzed separately from transactions associated with another user. If the AggregationID is unavailable, the transaction data server 140 may group transaction data by the AccountID. Transactions that may include a cash out event include automated teller machine (ATM) withdrawals, point of sale withdrawals, bank teller withdrawals, and/or quasi-cash channels (e.g., casinos). The transaction data server 140 may run the cash out rule on a regular basis (e.g., weekly). Because the cash out rule is triggered when total withdrawals over a multi-day period exceed a threshold value, the cash out rule could be triggered multiple times for the same cash out event (e.g., if on day one, $10,000 is withdrawn, the cash out rule would identify both day two and day three as exceeding the threshold value because the total withdrawals for day zero, day one, and day two would be $10,000 and the total withdrawals for day one, day two, and day three would also be $10,000). Thus, the transaction data server 140 may implement the cash out rule such that the cash out rule is triggered and an alert is generated if the total withdrawals over the multi-day period exceed the threshold value and a withdrawal occurred on the last day of the multi-day period. If no withdrawal occurs on the last day of the multi-day period, then the cash out rule is not triggered, thereby eliminating duplicative alerts.

The cash in rule may monitor for one or more cash deposits over a single-day or multi-day period (e.g., a one-day period, a three-day period, etc.) that collectively exceed a threshold value (e.g., a monetary value). In an embodiment, the transaction data server 140 groups transaction data from the join table(s) by the AggregationID or the AccountID (e.g., if the AggregationID is unavailable) such that transactions associated with a single user can be analyzed separately from transactions associated with another user. The transaction data server 140 may run the cash in rule on a regular basis (e.g., weekly). The transaction data server 140 may implement the same deduplication techniques as described above with respect to the cash out rule to eliminate duplicative alerts.

The sustained cash rule may monitor for accounts that load a minimum amount of cash per month for at least a threshold period of time through cash channels, such as point of sale locations and/or money network sites. If alerts are generated based on the rule being triggered, the transaction data server 140 may rank the alerts based on the amount of churn (e.g., the sum of the cash loads and absolute value of the cash withdrawals over the threshold period of time). The transaction data server 140 may run the sustained cash rule on a regular basis (e.g., monthly). The transaction data server 140 may implement the same deduplication techniques as described above with respect to the cash out rule to eliminate duplicative alerts.

The behavior outlier rule may monitor for outliers within certain behavioral clusters over a period of time (e.g., a month). The transaction data server 140 may consider statistical measures, such as the one-month means, standard deviations, and/or transaction counts of cash-in and/or cash-out activity. For example, the behavior outlier rule may be used to identify prepaid cards that are suspicious because such cards are outliers when compared to other cards of the same program. However, if there are a large number of programs (e.g., 10,000 programs) and each program has one prepaid card that is an outlier, then 10,000 alerts may be generated. To reduce the number of alerts to a meaningful number that can be investigated by the fraud analyst, the transaction data server 140 may organize the data using any known clustering technique, where the clustering is based on different features, such as cash-in data, cash-out data, the mean, the mode, the standard deviation, and/or the like, instead of the program names. The transaction data server 140 may initially validate the clustering by using historical transaction data to, for example, prevent overfitting (e.g., by using the historical transaction data to ensure that too many clusters are not created). Initially, the transaction data server 140 may use the behavior outlier rule to identify the top X (e.g., 10) outliers from each of the clusters based on a distance from a center of the cluster (or the outliers that are outside the cluster by at least a threshold value) and generate an alert for each of these outliers. The transaction data server 140 may then monitor subsequent actions (e.g., closed the alert, took an action, etc.) taken by the fraud analyst with respect to these generated alerts. A goal, for example, may be to identify a number of outliers from each of the clusters that are actioned a threshold percentage of the time (e.g., X percent of the time). If a percentage of the outliers from a cluster other than the threshold percentage of the outliers from a cluster are actioned (e.g., Y percent), the transaction data server 140 may use machine learning techniques to adjust the number of outliers that are identified from that cluster such that the threshold percentage is eventually achieved. The transaction data server 140 may run the behavior outlier rule on a regular basis (e.g., periodically). The same cluster definitions may be used each time the behavior outlier rule is run to achieve consistency. The transaction data server 140 may implement the same deduplication techniques as described above with respect to the cash out rule to eliminate duplicative alerts.

The cross-border cash rule may monitor for funds that are deposited and/or withdrawn in different countries. The transaction data server 140 may run the cross-border cash rule on a regular basis (e.g., periodically).

The foreign cash out rule may monitor the withdrawal of cash greater than a threshold value (e.g., a monetary value) within a period of time outside of the first country. The transaction data server 140 may run the foreign cash out rule on a regular basis (e.g., monthly). The transaction data server 140 may implement the same deduplication techniques as described above with respect to the cash out rule to eliminate duplicative alerts.

The high risk countries rule may monitor for any deposit and withdrawal that occur in a "high risk" country. Some or all transactions may be geo-tagged such that the high risk countries rule functions properly. The transaction data server 140 may run the high risk countries rule on a regular basis (e.g., periodically). The transaction data server 140 may implement the same deduplication techniques as described above with respect to the cash out rule to eliminate duplicative alerts.

The external funding rule may monitor for multiple prepaid card accounts funding the same external source. The transaction data server 140 may generate an alert if more than a threshold number of prepaid cards initiate transfers to the same external source. The transaction data server 140 may run the external funding rule on a regular basis (e.g., periodically). The transaction data server 140 may implement the same deduplication techniques as described above with respect to the cash out rule to eliminate duplicative alerts.

The tax refund rule may monitor and identify accounts that receive more than a threshold number of tax refunds. The transaction data server 140 may run the tax refund rule on a regular basis (e.g., periodically). The transaction data server 140 may implement the same deduplication techniques as described above with respect to the cash out rule to eliminate duplicative alerts.

The card-to-card transfer rule may identify accounts that transfer more than a threshold amount between them within a period of time. The transaction data server 140 may run the card-to-card rule on a regular basis (e.g., periodically). The transaction data server 140 may run the card-to-card transfer rule in conjunction with the cash in and/or cash out rules.

The transaction data server 140 may implement the same deduplication techniques as described above with respect to the cash out rule to eliminate duplicative alerts.

In an embodiment, a fraud analyst or another user may provide a list of accounts, account identifiers, names, social security numbers, and/or the like that are to be monitored on a regular basis (e.g., weekly). The transaction data server 140 may run a watch list rule, which causes each of the rules described above to be run on the data associated with the listed entities. Each time the watch list rule is run (e.g., weekly), the transaction data server 140 may generate a report indicating that no suspicious activity was detected and/or some suspicious activity was detected (e.g., identifying those rules that were triggered).

Similarly, a fraud analyst or another user may provide a list of accounts, account identifiers, names, social security numbers, and/or the like that are to be monitored once. The transaction data server 140 may run a manual trigger rule, which causes each of the rules described above (except the watch list rule) to be run on the data associated with the listed entities. When the manual trigger rule is run (just once), the transaction data server 140 may generate a report indicating that no suspicious activity was detected and/or some suspicious activity was detected (e.g., identifying those rules that were triggered).

Additional rules run by the transaction data server 140 may include a payroll rule and a maximum account rule. The payroll rule may be used by the transaction data server 140 to identify transactions that are illegitimate payroll transactions. The transaction data server 140 may use clustering and the machine learning techniques as described above to find outliers within these transactions, and generate alerts based on the identified outliers. The maximum account rule may identify the maximum number of accounts that can be associated with an address and/or name (and be triggered if the maximum number is exceeded).

Alerts

Figure 6A:
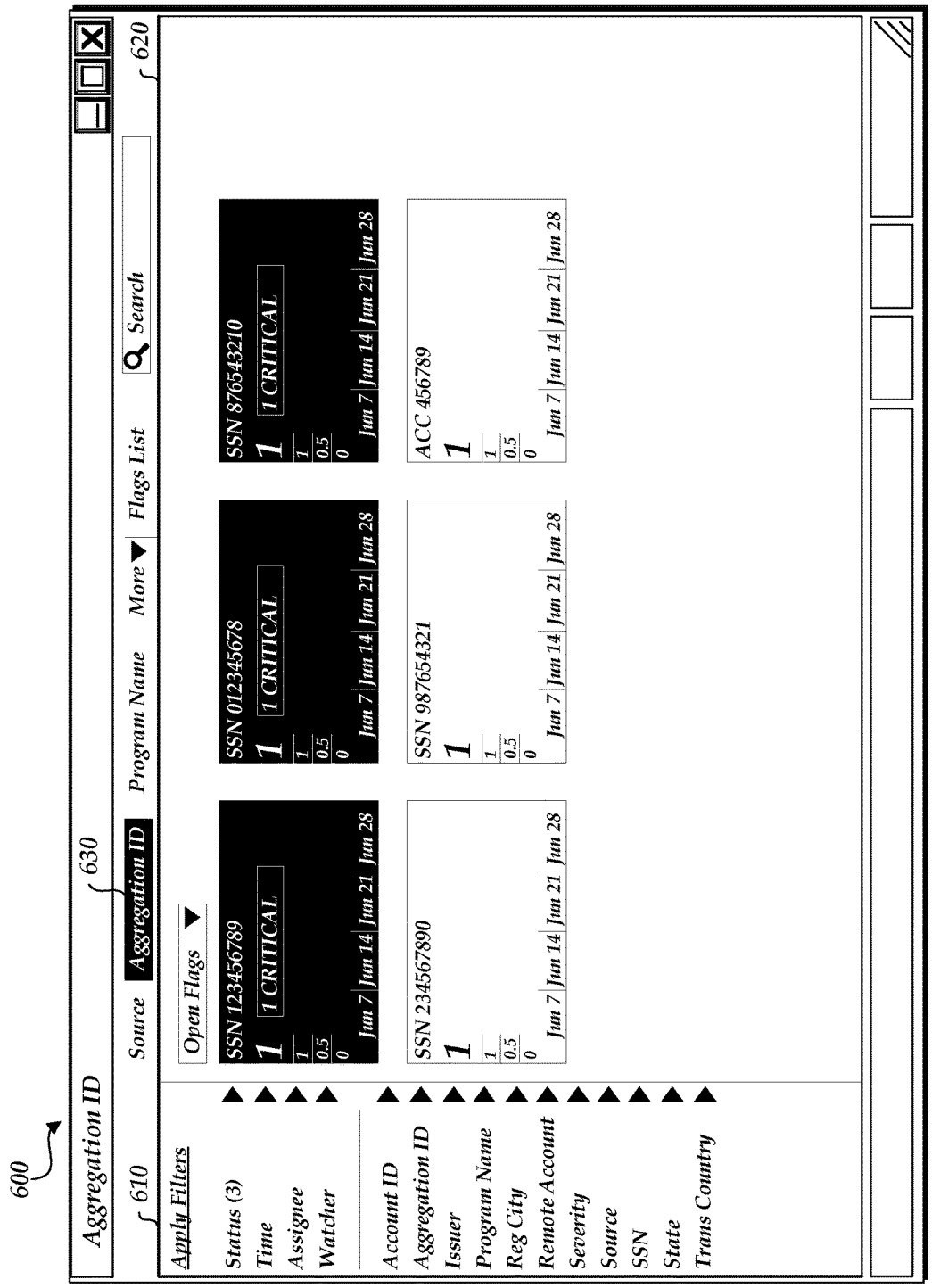

If a rule is triggered, the transaction data server 140 may generate the appropriate alert. FIGS. 6A-6M illustrate a user interface 600 displaying generated alerts. The user interface 600 may be displayed in the display of the transaction data analysis device 130. As illustrated in FIG. 6A, the user interface 600 includes a filter window 610 and an alert window 620. The alert window 620 may display one or more alert summaries that each summarize an alert generated by the transaction data server 140. The alert summaries may indicate which alerts are critical and which alerts are not critical. An alert may be critical based on the rule that triggered the generation of the alert and/or a number of rules that have been triggered by a given user or account. The alert summaries may be organized by AggregationID, as indicated by the selection of Aggregation ID button 630. The alert summaries that are displayed may be filtered using any of the filters in the filter window 610.

Figure 6B:
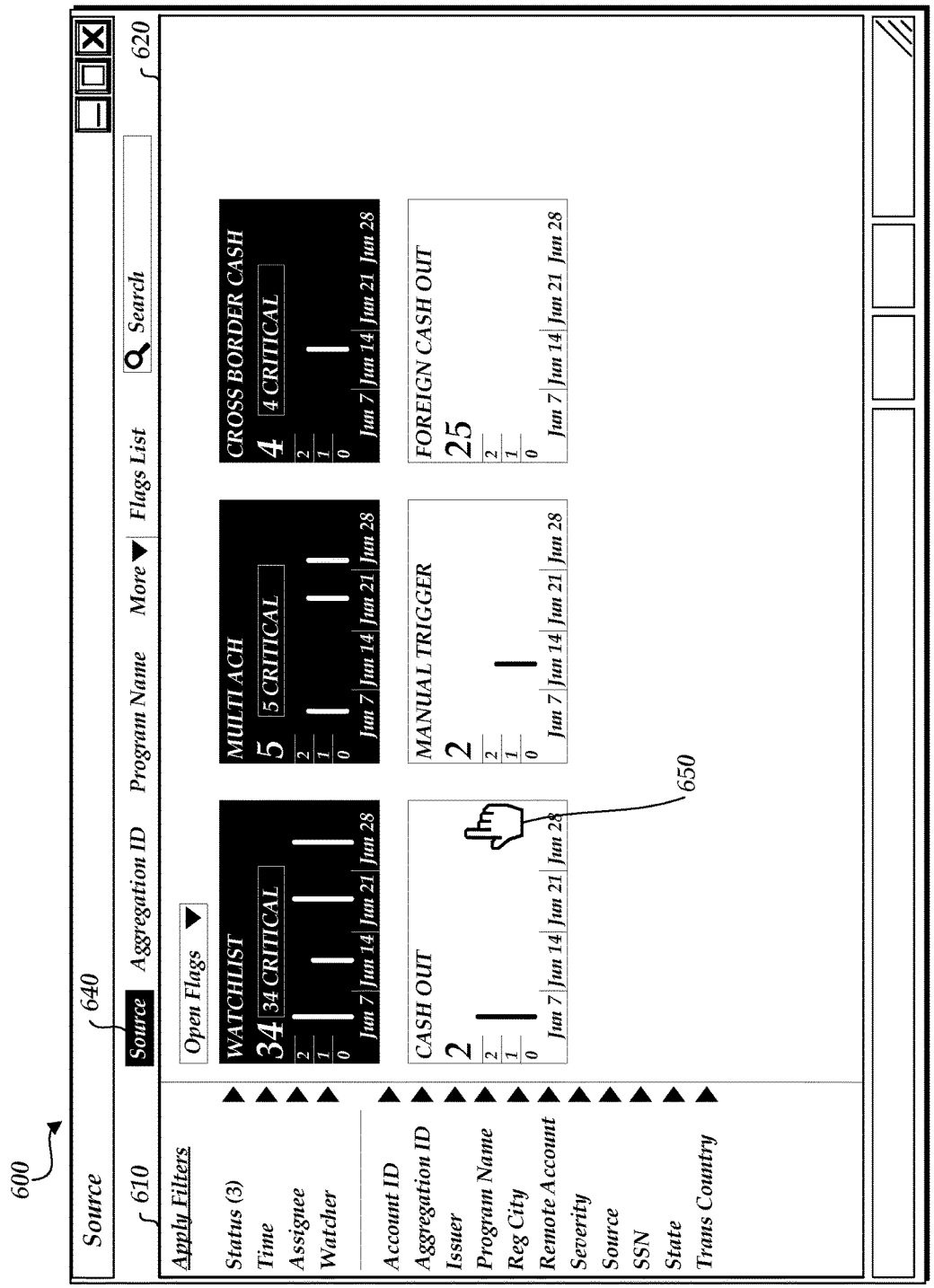
Figure 6C:
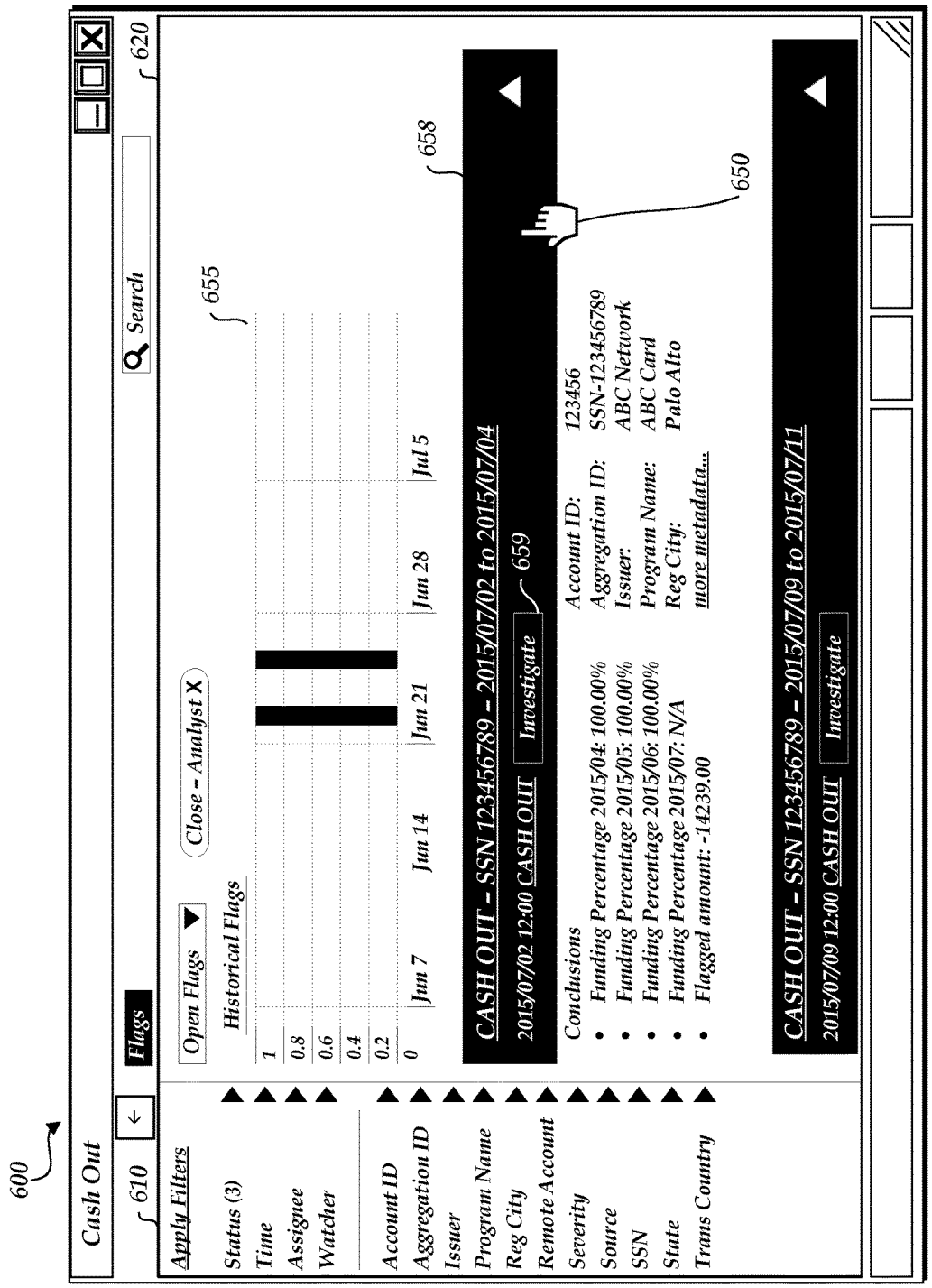

The alert summaries may also be organized by source (e.g., rule that triggered the alert) via the selection of source button 640, as illustrated in FIG. 6B. Each of the alert summaries are selectable to view more information about the alert(s). For example, the fraud analyst, using cursor 650, may trigger the cash out alert summary. Selection of the cash out alert summary causes the alert window 620 to display a graph 655 and a list of cash out alerts, as illustrated in FIG. 6C. The graph 655 may indicate a date that an alert was generated and how many alerts were generated on specific days. Each alert in the list of cash out alerts provides a more detail information associated with the alert. For example, alert 658 in the list of cash out alerts identifies the type of rule that triggered the alert (e.g., cash out), an identifier linked to the user of the prepaid card (e.g., the AggregationID, which includes the user's social security number), a date range associated with the alert 658, a date that the alert 658 was generated, an action label 659, and conclusions or results associated with the alert 658. The action label 659 may identify which action has been taken by the fraud analyst in response to the alert 658 and/or may identify that no action has been taken. Conclusions may include the funding percentage (e.g., what percentage of a prepaid card is funded by non-suspicious activity) over various months, a flagged amount, an Account ID, an Aggregation ID, an issuer of the prepaid card, a program name from which the prepaid card was issued, a city of residence for the user of the card, and/or other metadata.

Figure 6D:
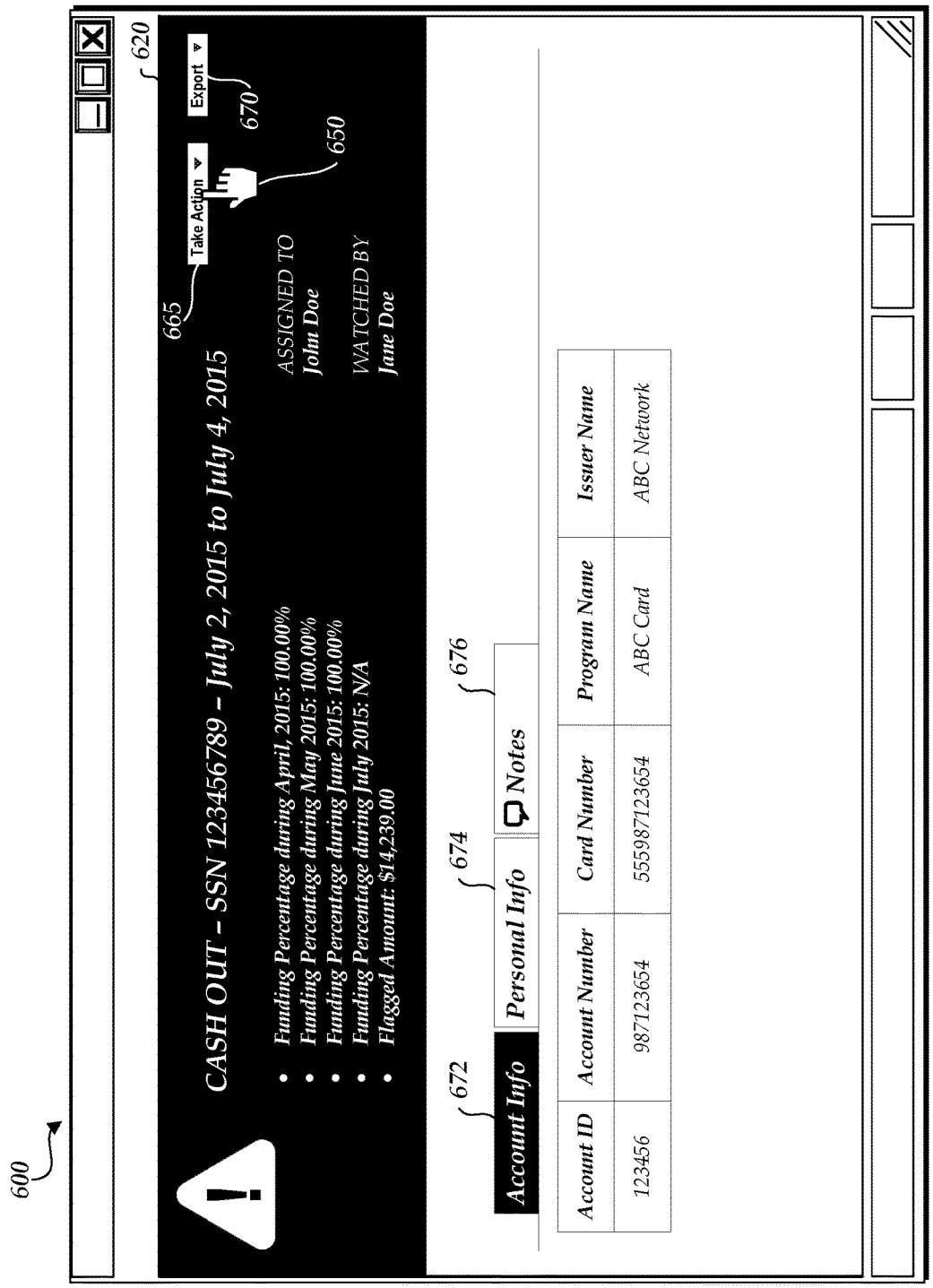

Selection of the alert 658 may cause the alert window 620 to display even more information associated with the alert 658, as illustrated in FIG. 6D. The alert window 620 may display the same conclusions as discussed above with respect to FIG. 6C. The alert window 620 may also display a name of a person assigned to the alert 658 and a name of a person watching the alert 658. The alert window 620 may also include three tabs: account info tab 672, personal info tab 674, and notes tab 676. The account info tab 672 may display the Account ID, the Account Number, the Card Number, the Program Name, and the Issuer Name associated with the prepaid card that triggered the cash out alert.

Figure 6E:
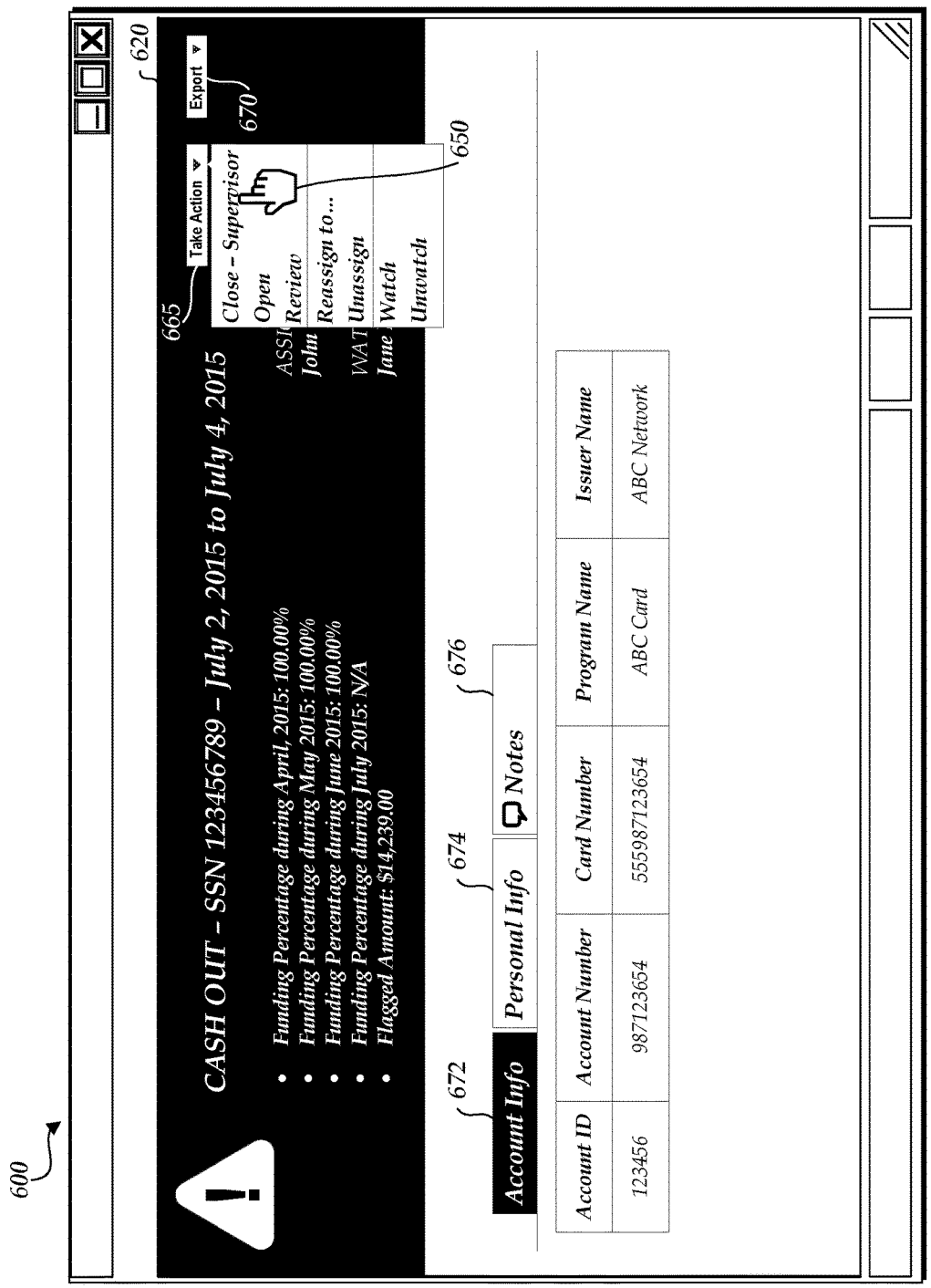

The alert window 620 also includes a take action button 665 and an export button 670. Selection of the export button 670 may allow the fraud analyst to export details of the alert 658 to a file (e.g., a spreadsheet file or an image file). Selection of the take action button 665, using for example the cursor 650, may cause a plurality of options to appear, as illustrated in FIG. 6E.

Possible action options include closing the alert 658, opening details associated with the alert 658, reviewing the alert 658 (to, for example, generate a report), reassigning the alert 658 to another user, unassigning the alert 658, setting another user as the user watching the alert 658, or removing a user from watching the alert 658.

Figure 6F:
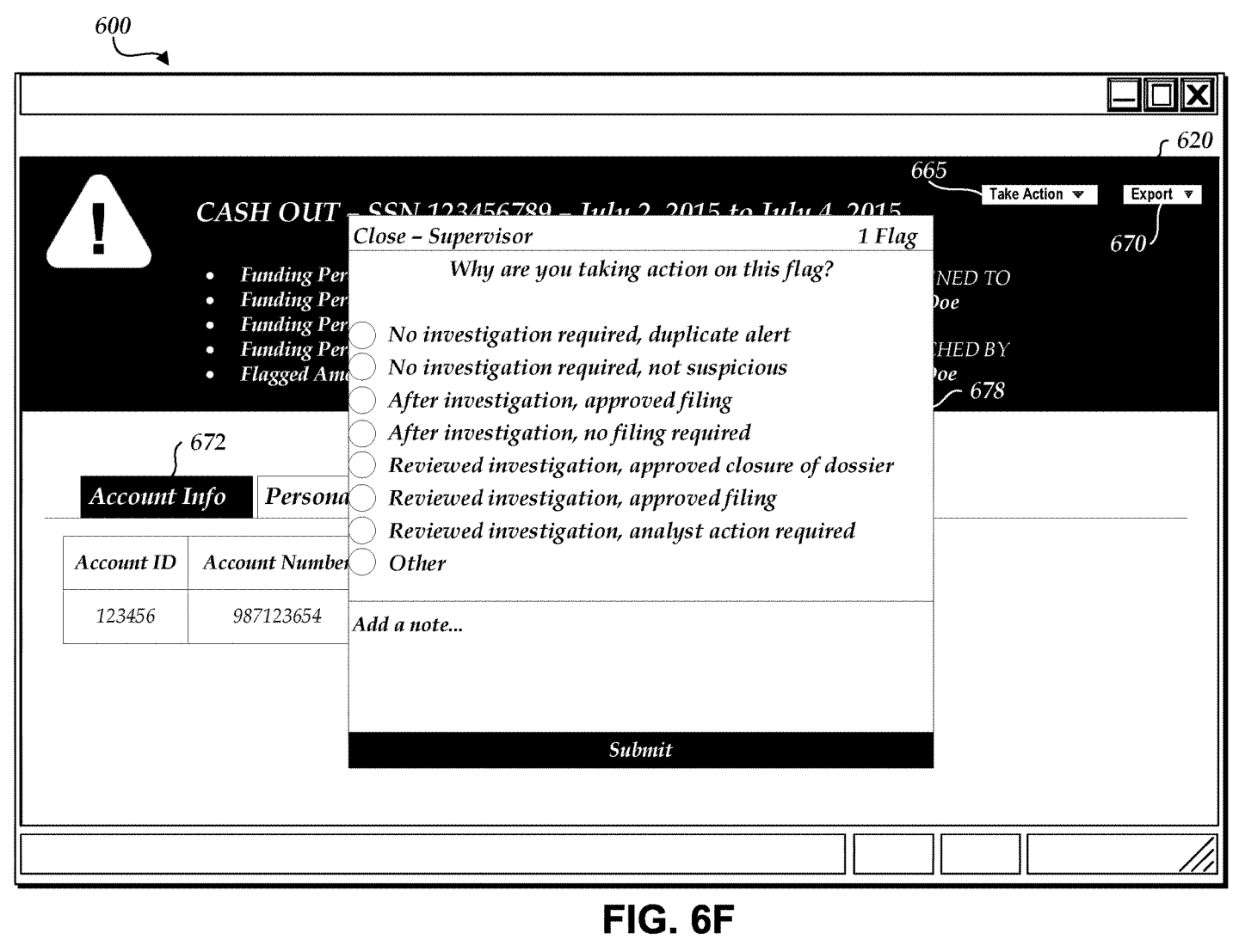

If, for example, the close option is selected using the cursor 650, window 678 may appear, as illustrated in FIG. 6F. The window 678 may request the fraud analyst to select a reason why the alert 658 is being closed and provide an option to include additional notes.

Figure 6G:
Figure 6H:
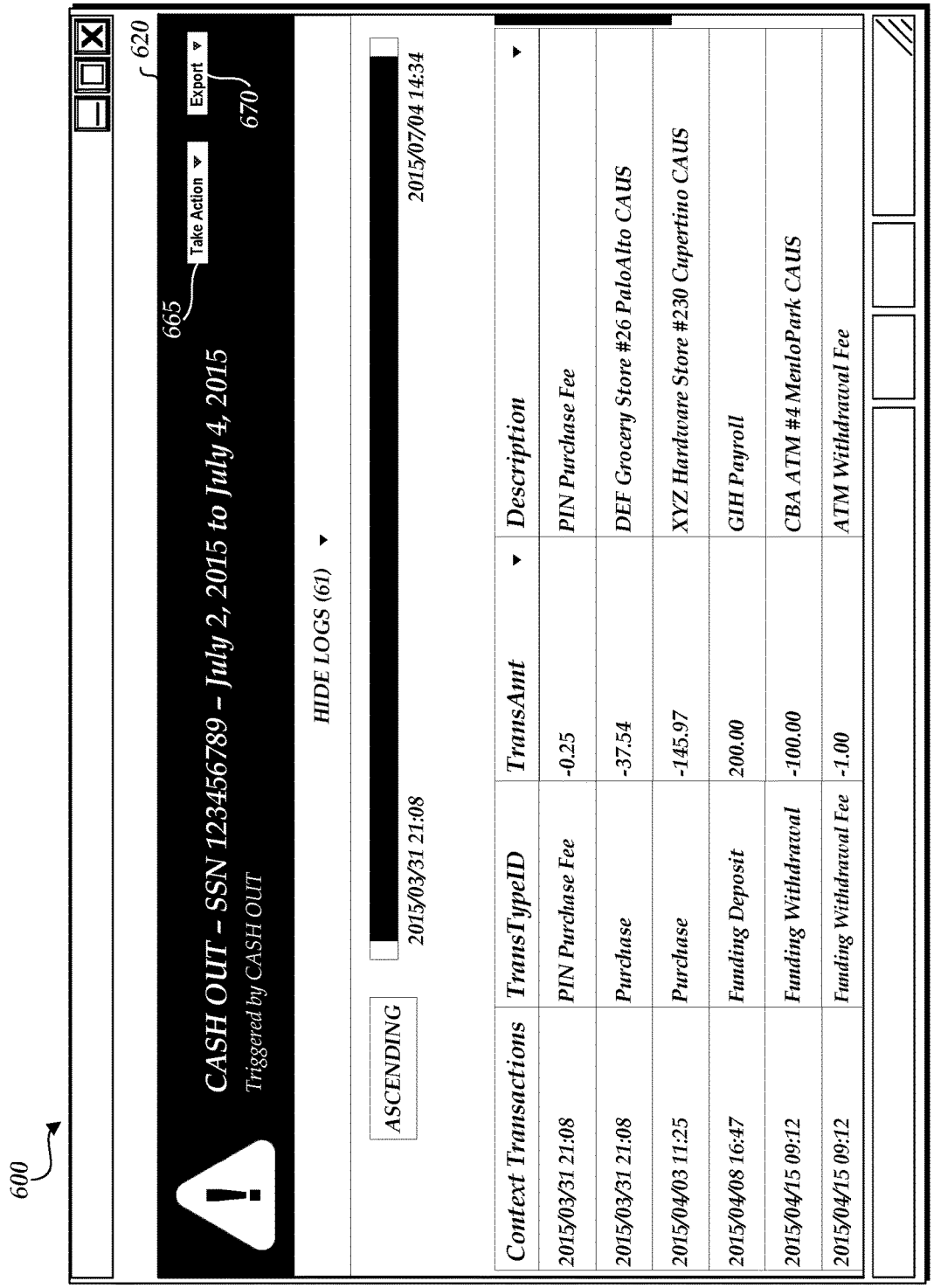

The personal info tab 674 may display the name, Account ID, username, social security number, electronic mail address, phone number, address, and date of birth associated with the prepaid card that triggered the cash out alert, as illustrated in FIG. 6G. The personal info tab 674 may also include a show logs button 680. The show logs button 680, when selected, may show the transaction details for the prepaid card that triggered the alert 658 and a period of time for which transaction details are provided, as illustrated in FIG. 6H.

Figure 6J:
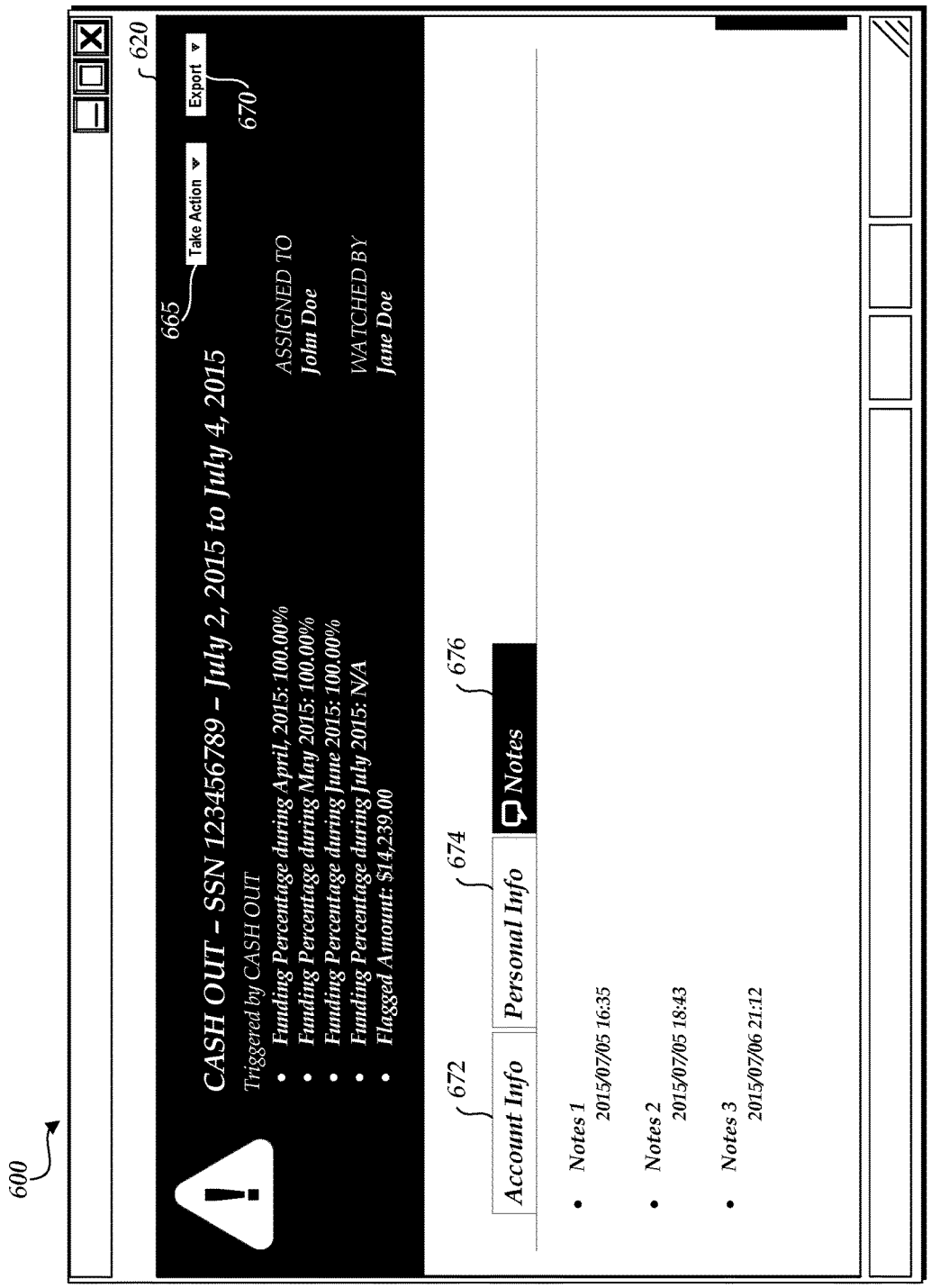

The notes tab 676 may include a text box that allows the fraud analyst to enter any notes or comments associated with the alert 658, as illustrated in FIG. 6I. The notes tab 676 further lists the notes or comments that have been previously entered and a time that the notes or comments were entered, as illustrated in FIG. 6J.

Figure 6K:
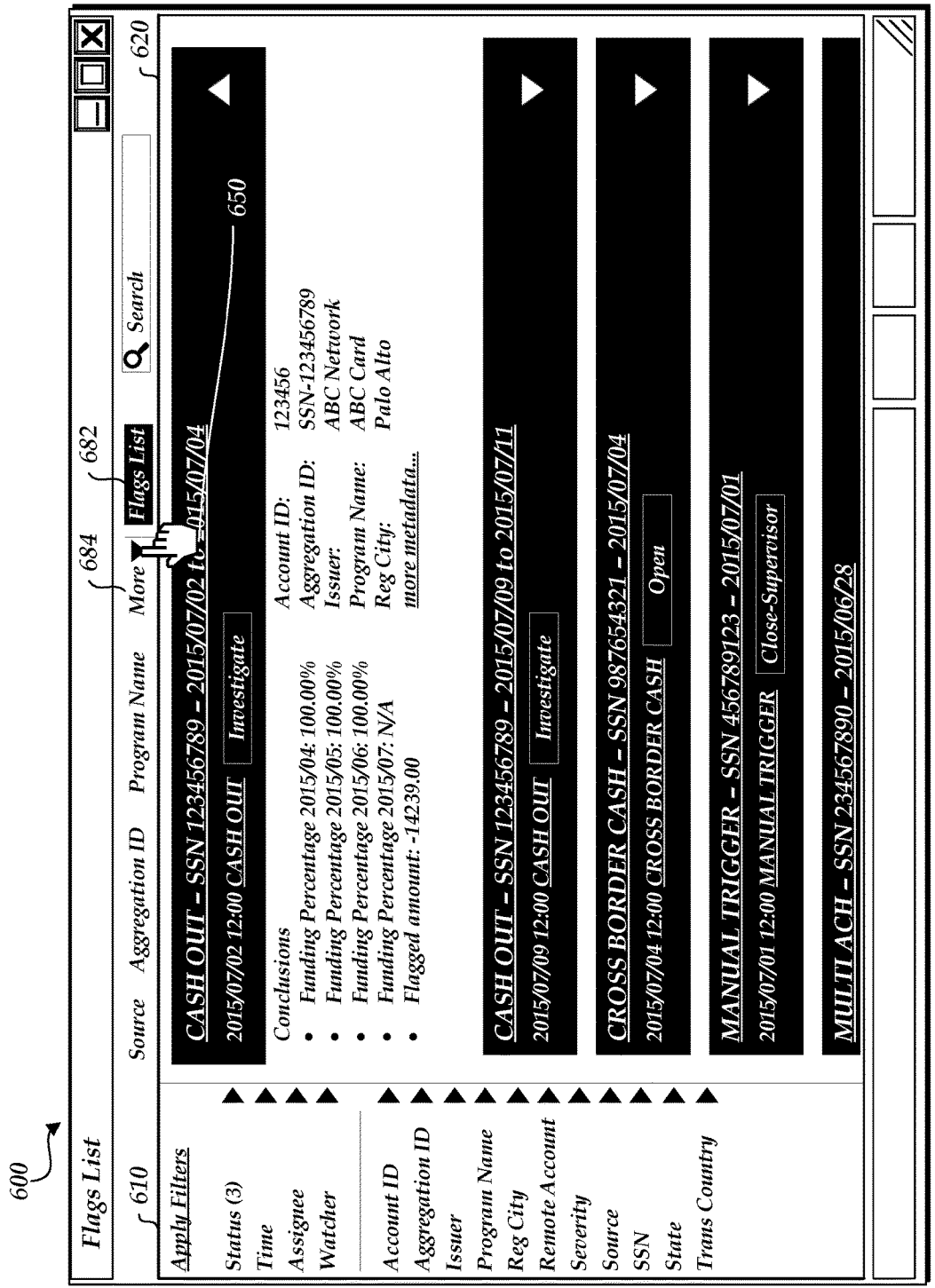
Figure 6L:
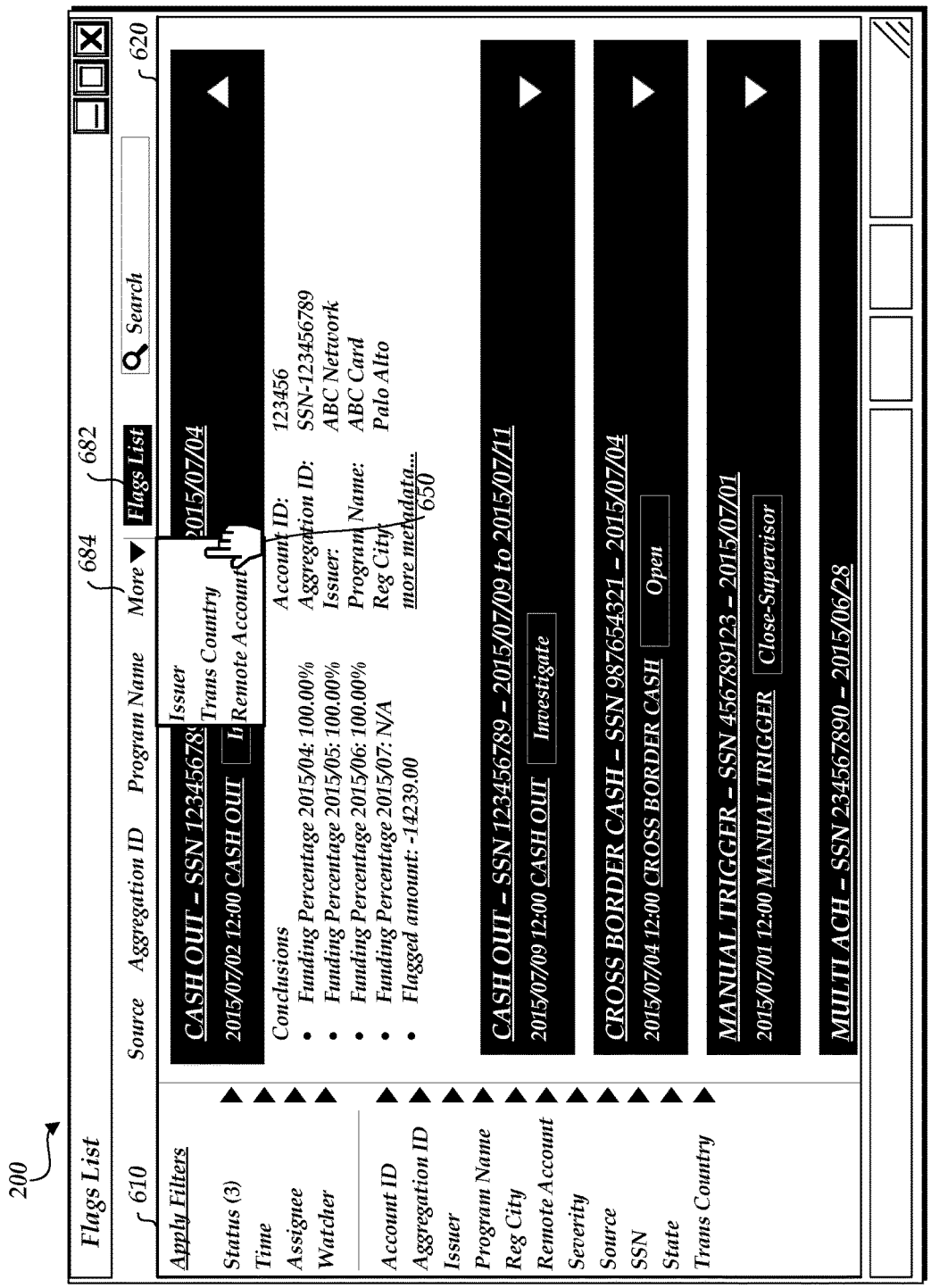
Figure 6M:
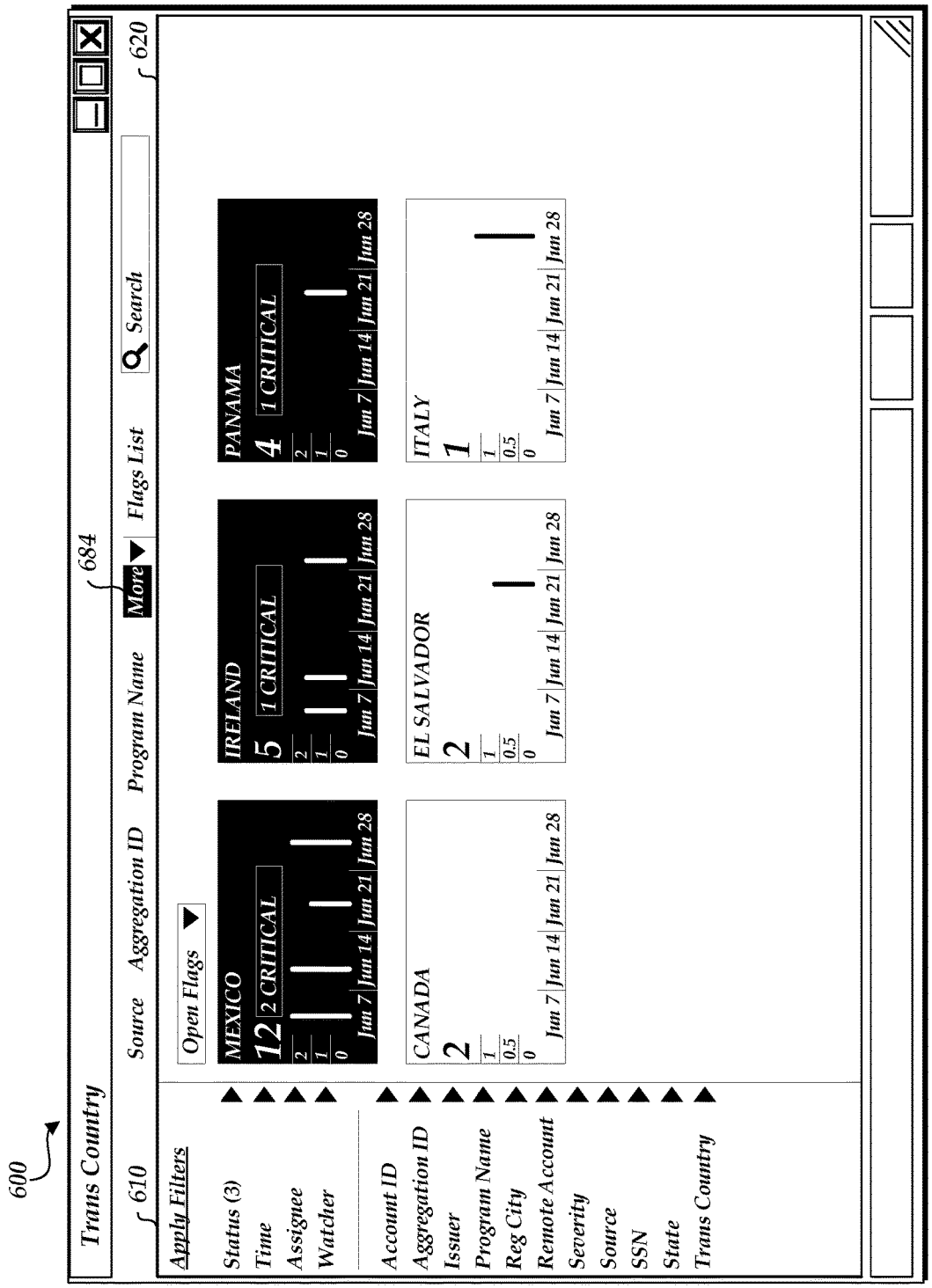

The alert summaries may also be organized by flags (e.g., a list of all alerts organized by type of rule that triggered the alert) via the selection of flags list button 682, as illustrated in FIG. 6K. The fraud analyst may select more button 684 to organize the alert summaries in other ways. For example, the alert summaries can further be organized by issuer, transaction country, and/or by those with a remote account (e.g., an account based in a foreign country), as illustrated in FIG. 6L. Selection of the transaction country option may cause the alert window 620 to organize the alert summaries by the countries from which transactions originated to cause a rule to be triggered, as illustrated in FIG. 6M.

FIG. 7 illustrates a user interface 700 displaying a table view of generated alerts. The user interface 700 may be displayed in the display of the transaction data analysis device 130. As illustrated in FIG. 7, the user interface 700 may include a window 710 that includes a table that lists details for various alerts that have been generated, such as AggregationID, flagged month (e.g., the month the alerted was generated), flag date (e.g., date range associated with the alert), conclusions, priority, rule that triggered the alert, and/or a rule ID (e.g., identifies the rule that triggered the alert, the AggregationID, and the flag date). The table can be downloaded using download button 215 or sorted using sort button 220.

Figure 8A:
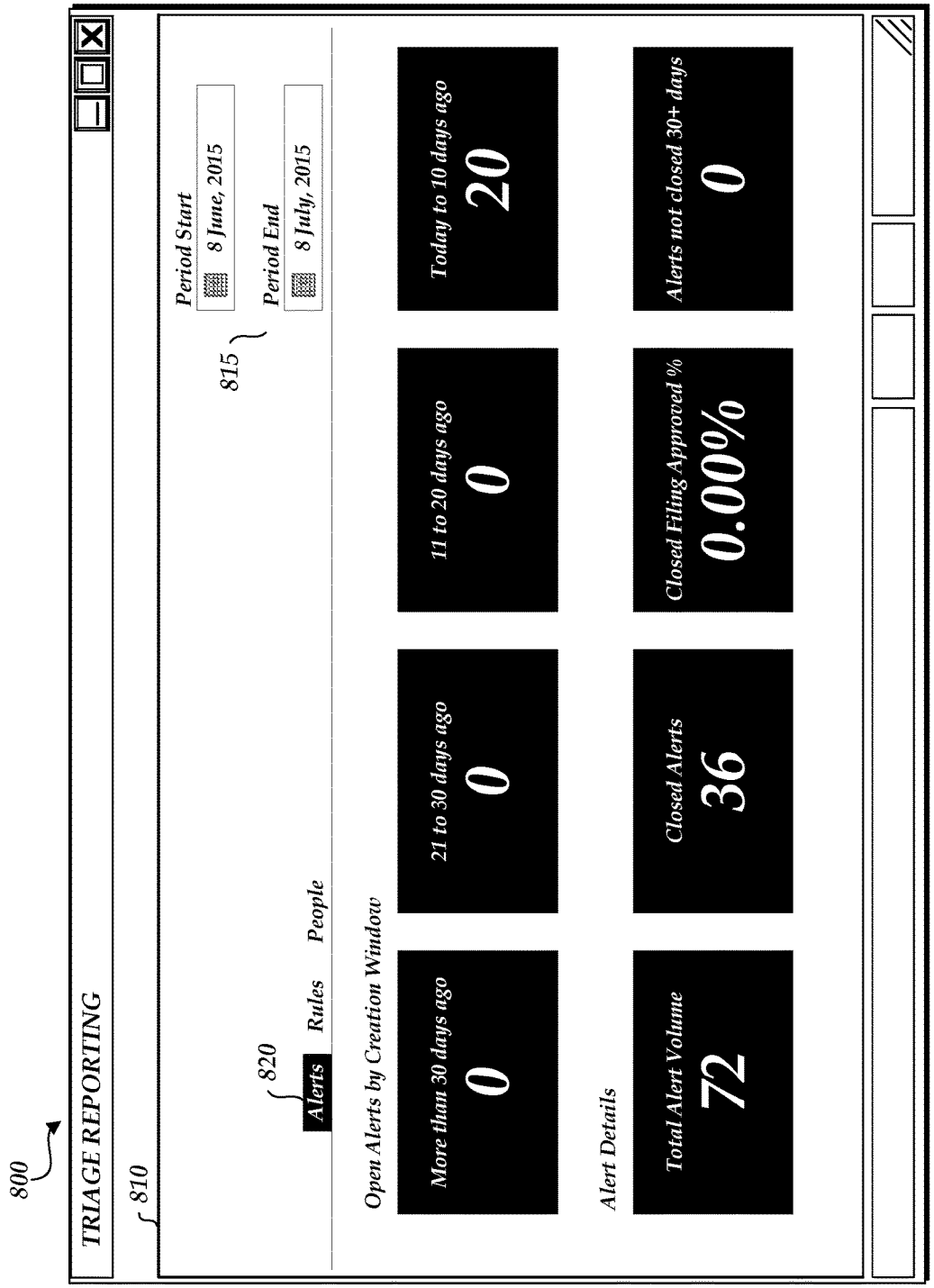
FIGS. 8A-8D illustrate a user interface depicting a triage reporting of all generated alerts.

FIGS. 8A-8D illustrate a user interface 800 depicting a triage reporting of all generated alerts. The user interface 800 may be displayed in the display of the transaction data analysis device 130. As illustrated in FIG. 8A, the user interface 800 includes a window 810 that provides a selectable calendar 815 to specify a date range and an alerts tab 820. Within the alerts tab 820, a number of open alerts is indicated, organized by time that the alert has been open (e.g., more than 30 days, 21 to 30 days, 11 to 20 days, 10 or fewer days, etc.), and alert details are provided. The alert details include a total number of alerts, a total number of alerts that have been closed, a percentage of closed alerts for which a report has been approved to be filed, and a number of alerts that have not been closed and that have been open for longer than 30 days.

Figure 8B:
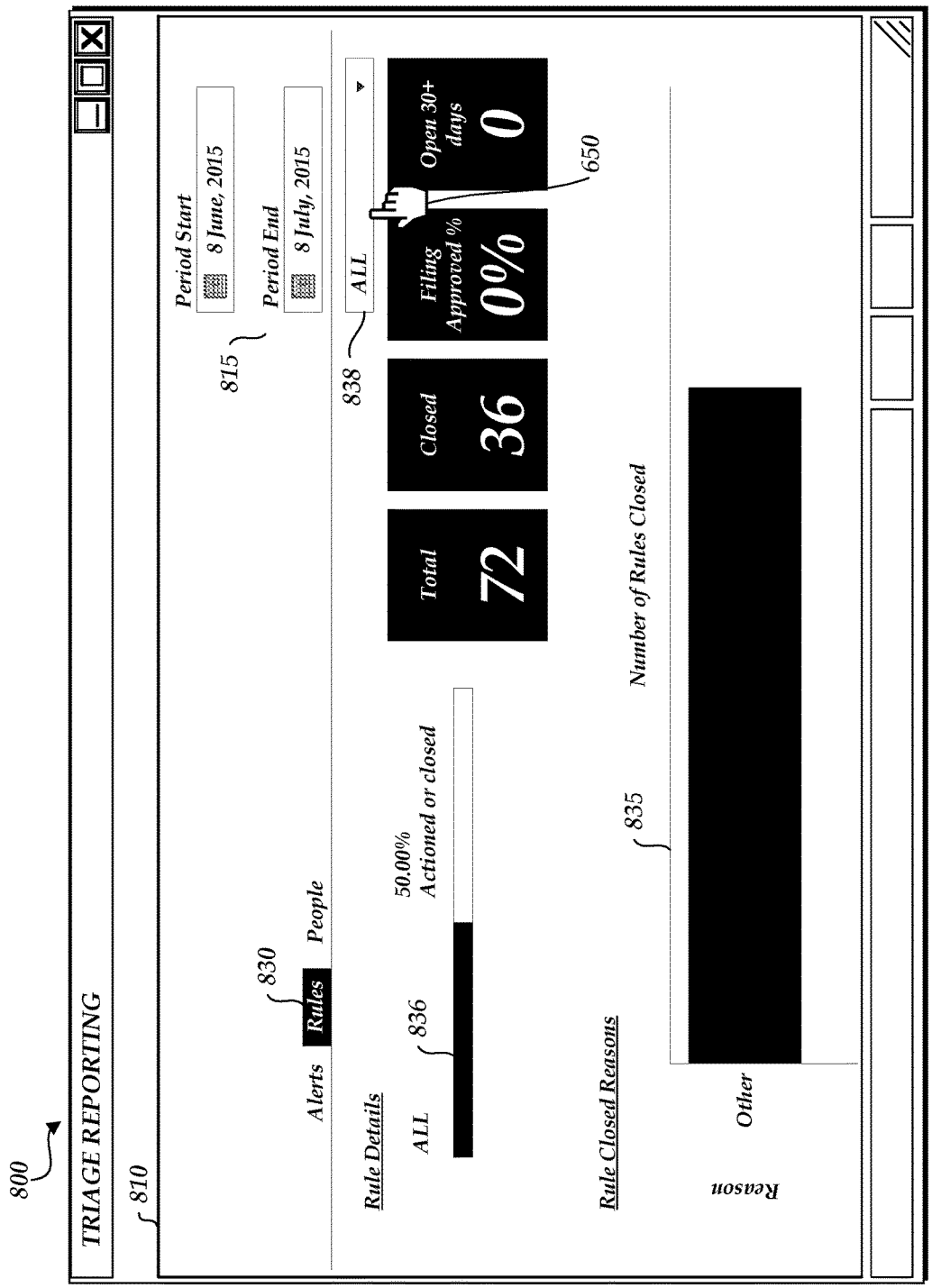

The window 810 further includes a rules tab 830 that, when selected, provides additional rules details and a graph 835 indicating reasons why various alerts were closed and a number of alerts that have been closed based on a specific reason, as illustrated in FIG. 8B. The rule details may include a graph 836, such as a bar graph, that indicates a percentage of alerts that have been actioned (e.g., a report was generated) or closed. The rule details further include an indication of a total number of alerts, a total number of alerts that have been closed, a percentage of closed alerts for which a report has been approved to be filed, and a number of alerts that have not been closed and that have been open for longer than 30 days.

Figure 8C:
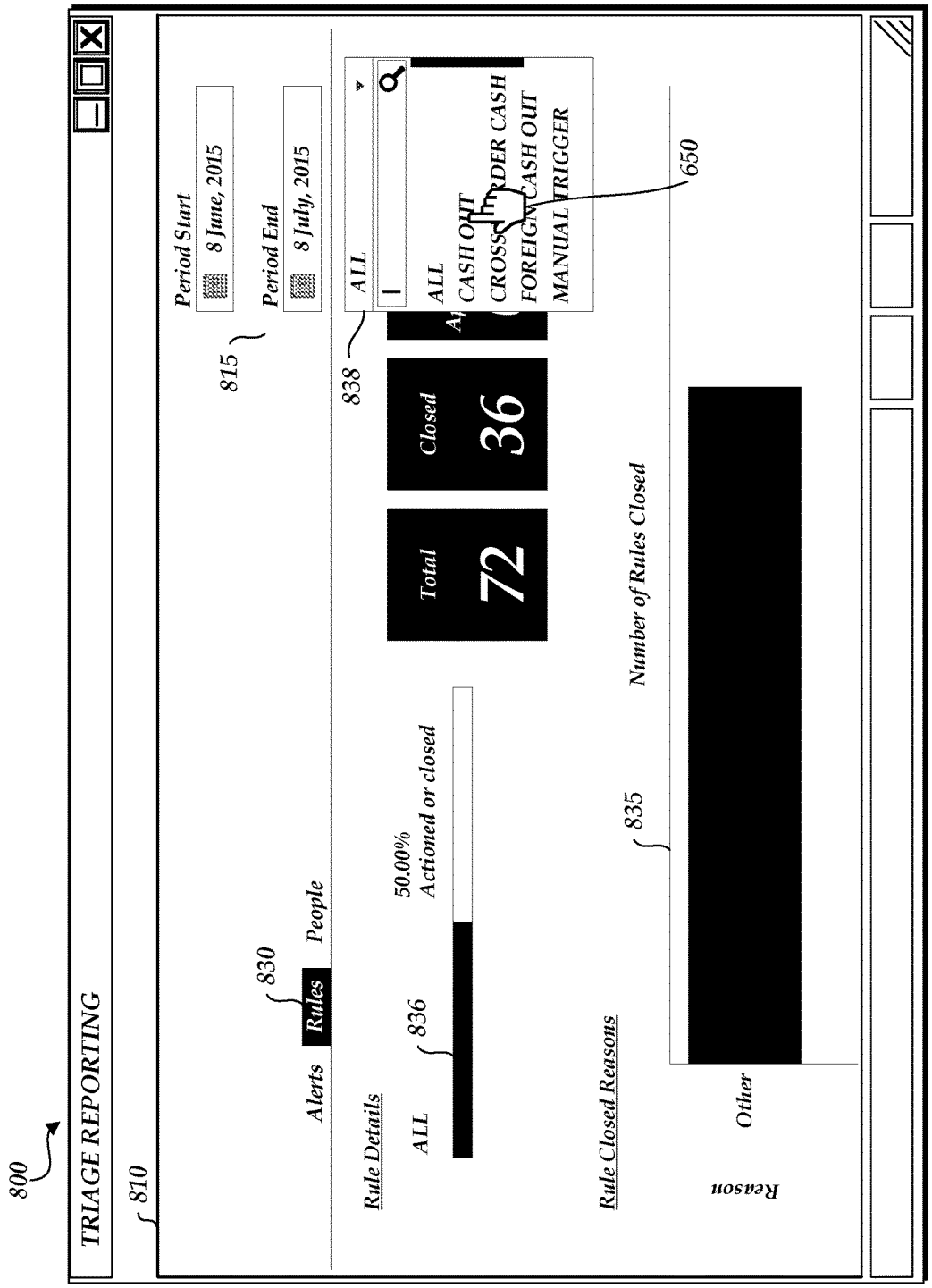
Figure 8D:
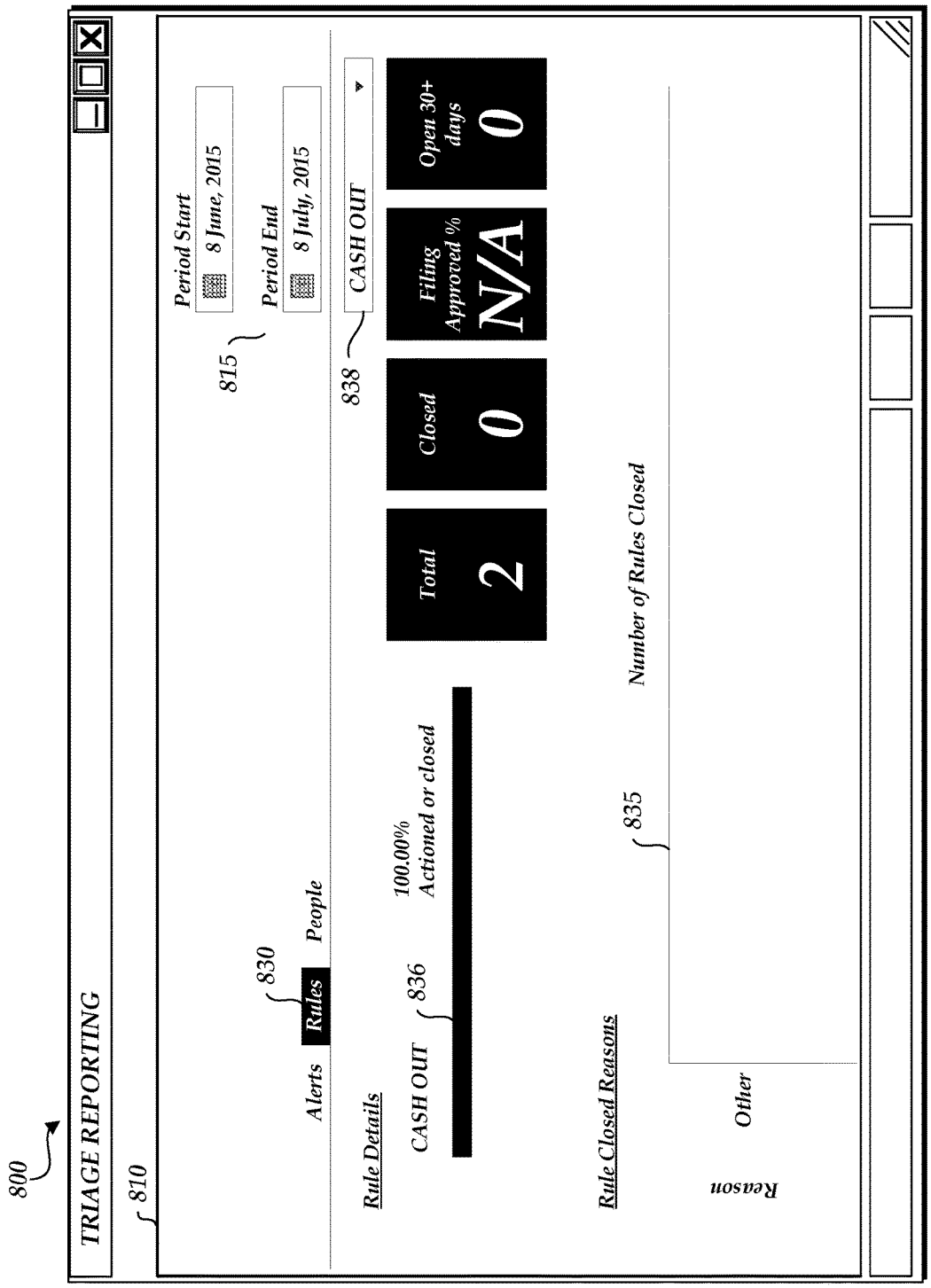

The rule details further include a dropdown menu 838. The dropdown menu 838, when selected using the cursor 650, provides the fraud analyst with the option to view rule details for a specific rule (rather than all the rules together), as illustrated in FIG. 8C. Selection of the cash out rule in the dropdown menu 838, for example, causes the rule details (e.g., the graph 836 and the rule statistics) and the rule closed reasons (e.g., the graph 835) to update to reflect just the statistics for the cash out rule, as illustrated in FIG. 8D.

In some cases, the user associated with a prepaid card may not be readily apparent or it may be difficult to determine whether two separate accounts are actually for the same user (because, for example, the address of the two accounts is the same). In such a situation, the transaction data server 140 may link perform entity resolution. For example, the transaction data server 140 may generate a graph in which each element of the graph corresponds to an account. A link may be created between elements if the elements share the same property (e.g., the same address, the same AggregationID, the same name, etc.). Once all possible links have been established, the transaction data server 140 may associate all linked elements with a single user or entity and the rules may be run using such information. In some embodiments, the linked elements can be hashed (e.g., one or more properties that cause the linkage could be hashed) to create a unique ID for the single user or entity.

In some embodiments, the alerts are automatically transmitted by the transaction data server 140 to the transaction data analysis device 130 and/or another user device (e.g., a mobile device operated by a user). The alerts can be transmitted at the time that the alerts are individually generated or at some determined time after generation of the alerts (e.g., as a push notification). When received by the transaction data analysis device 130, one or more of the alerts can cause the device to display the alerts via the activation of an application on the transaction data analysis device 130 (e.g., a browser, a mobile application, etc.). For example, receipt of an alert may automatically activate an application on the transaction data analysis device 130, such as a messaging application (e.g., SMS or MMS messaging application), a standalone application (e.g., a malicious activity monitoring application), or a browser, for example, and display information included in the alert. If the transaction data analysis device 130 is offline when the alert is transmitted, the application may be automatically activated when the transaction data analysis device 130 is online such that the alert is displayed. As another example, receipt of an alert may cause a browser to open and be redirected to a login page generated by the transaction data server 140 so that a user can log in to the transaction data server 140 and view the alert. Alternatively, the alert may include a URL of a webpage (or other online information) associated with the alert, such that when the transaction data analysis device 130 (e.g., a mobile device) receives the alert, a browser (or other application) is automatically activated and the URL included in the alert is accessed via the Internet.

One or more alerts can be transmitted by being packaged into an electronic message, such as an email, an instant message, a text message, a push notification, a network packet, and/or the like. For example, the electronic message can be an email and the complete alert can be included within the body of the email or a portion of the alert can be included within the subject line or body of the email with a link (e.g., URL) that can be accessed to view the complete alert. The electronic message can be transmitted by the transaction data server 140 to another system (not shown), such as an email server, accessible by the transaction data analysis device 130 or the transaction data analysis device 130 itself. Contents of the electronic message can be displayed within an interactive user interface (e.g., one of the user interfaces 600, 700, and/or 800) generated by the email server and/or the transaction data analysis device 130 such that the user can view the alert or a portion thereof.

Example Process Flow

Figure 9:
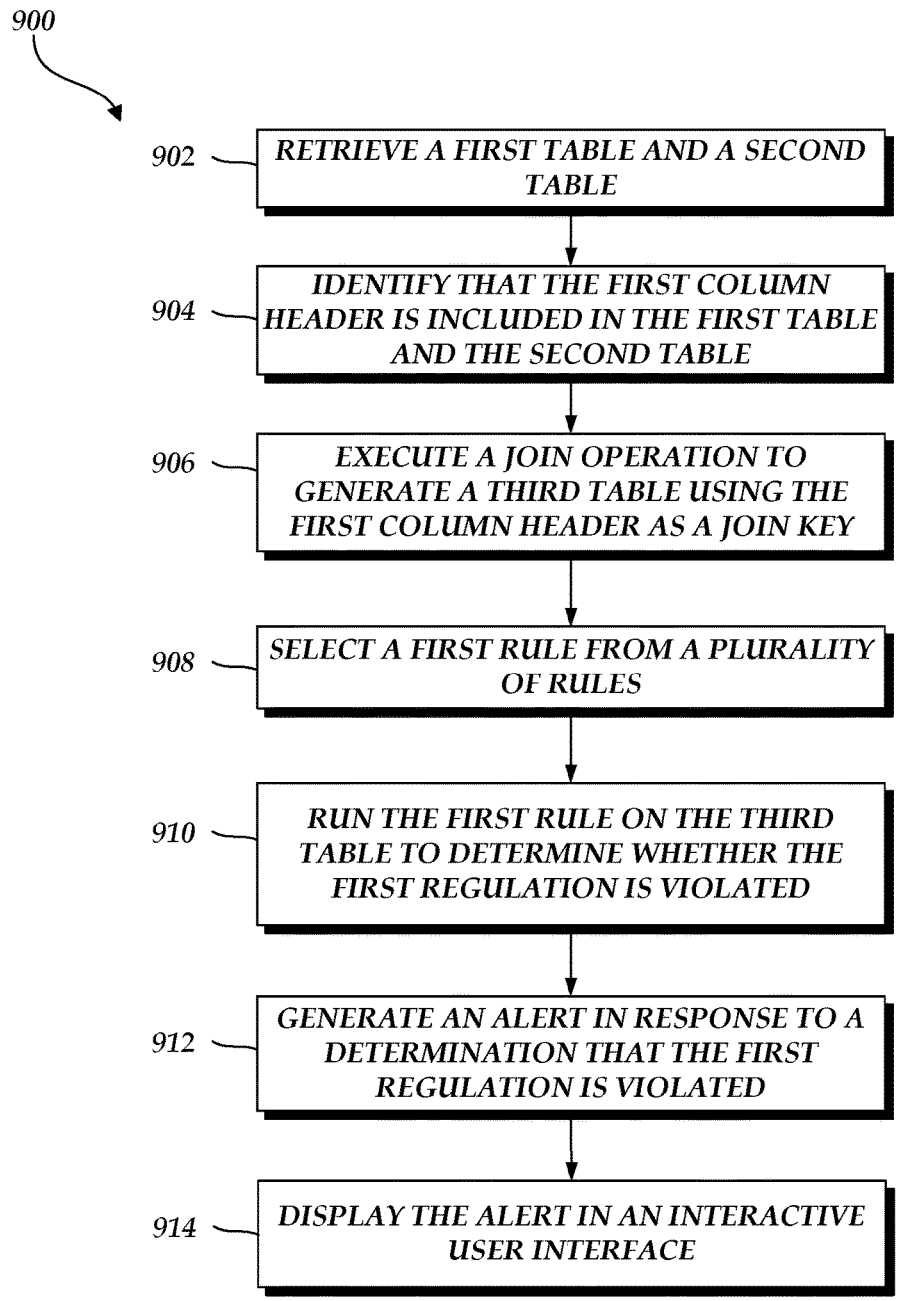
FIG. 9 is a flowchart depicting an illustrative operation of displaying claims adjustments.

FIG. 9 is a flowchart 900 depicting an illustrative operation of reorganizing and analyzing transaction data to generate alerts. Depending on the embodiment, the method of FIG. 9 may be performed by various computing devices, such as by the transaction data analysis device 130 and/or the transaction data server 140. For ease of discussion, the method is discussed herein with reference to the transaction data server 140. Depending on the embodiment, the method of FIG. 9 may include fewer and/or additional blocks and the blocks may be performed in an order different than illustrated.

In block 902, a first table and a second table are retrieved. The first table may include a first column header, a second column header, and first data corresponding to the first column header or the second column header. The second table may include the first column header, a third column header, and second data corresponding to the first column header or the third column header.

In block 904, it is identified that the first column header is included in the first table and the second table. For example, the first column header may be the Aggregation ID.

In block 906, a join operation to generate a third table using the first column header as a join key is executed. The third table may include the first column header, the second column header, the third column header, and the first and second data.

In block 908, a first rule from a plurality of rules is selected. The first rule may be associated with a first regulation that governs the use of prepaid cards.

In block 910, the first rule is run on the third table to determine whether the first regulation is violated. The first rule may be run on a periodic basis.

In block 912, an alert is generated in response to a determination that the first regulation is violated. The alert may include information identifying a user associated with the prepaid card that triggered the generation of the alert and the violation of the first regulation.

In block 914, the alert is displayed in an interactive user interface. For example, the alert may be displayed as depicted in FIGS. 6A-6M. The interactive user interface may also display a summary of generated alerts, as depicted in FIGS. 8A-8D.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
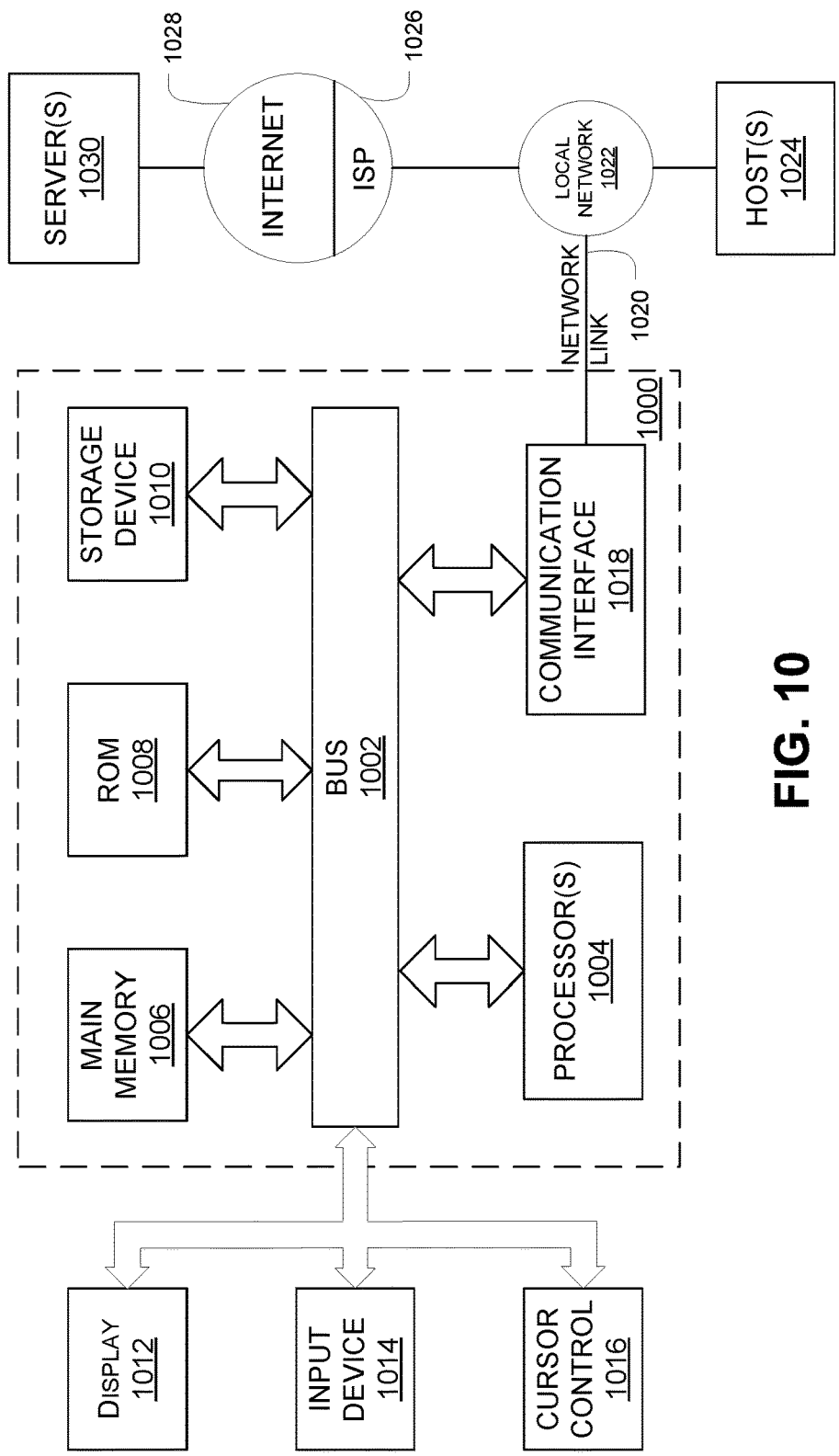
FIG. 10 illustrates a computer system with which certain methods discussed herein may be implemented.

For example, FIG. 10 is a block diagram that illustrates a computer system 1000 upon which an embodiment may be implemented. For example, any of the computing devices discussed herein, such as the transaction data analysis device 130, the transaction data server 140, and the issuers 110 may include some or all of the components and/or functionality of the computer system 1000.

Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

Computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

Computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 804 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may retrieve and execute the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system comprising:
   a database storing a first data set and a second data set associated with one or more accounts, wherein the first data set comprises a first data section, a second data section, and first data, wherein the first data comprises a first subset of data and a second subset of data, and wherein the second data set comprises the first data section, a third data section, and second data;

a computer processor; and a computer readable storage medium storing program instructions configured for execution by the computer processor in order to cause the computing system to:

select a first rule from a plurality of rules, wherein the first rule is associated with a behavior associated with the one or more accounts;

retrieve the first data set and the second data set from the database;

determine that the first rule does not use the second subset of data to determine whether the behavior is risky;

remove the second subset of data from the first data to form modified first data in response to the determination that the first rule does not use the second subset of data to determine whether the behavior is risky;

identify that the first data section is included in the first data set and the second data set;

generate a third data set that comprises the first data section, the second data section, the third data section, the modified first data, and the second data;

run the first rule on the third data set to determine whether the behavior is risky;

generate an alert in response to a determination that the behavior is risky; and transmit the alert for display in an interactive user interface.

2. The computing system of claim 1, wherein the interactive user interface comprises a button that allows a user to take an action associated with the displayed alert.

3. The computing system of claim 1, wherein the program instructions are further configured to cause the computing system to:

use a clustering process to separate the modified first data and the second data into a plurality of clusters;

identify a third subset of the modified first data or the second data that fall outside of a first cluster in the plurality of clusters by at least a threshold value; and generate an alert for each of the items in the third subset of the modified first data or the second data.

4. The computing system of claim 1, wherein the first rule is a cash out rule.

5. The computing system of claim 1, wherein the database further stores historical data, and wherein the program instructions are further configured to cause the computing system to:

retrieve the historical data from the database, wherein running the first rule on the historical data causes the computing system to determine that the behavior is risky;

merge the modified first data and the historical data;

run the first rule on the merged modified first data and historical data;

determine whether the behavior is risky; and determine that the modified first data is valid in response to a determination that the behavior is risky.

6. The computing system of claim 1, wherein the database receives data from an issuer database in periodic intervals, and wherein the program instructions are further configured to cause the computing system to:

select the first data set, wherein a third subset of the first data is expected to be received at a first time and a fourth subset of the first data is expected to be received at a second time;

determine that the fourth subset of the first data was not received at the second time; and generate a notification for display in the interactive user interface, wherein the notification instructs a user to retrieve the fourth subset of the first data.

7. The computing system of claim 1, wherein the first rule is one of a cash out rule, a cash in rule, a sustained cash rule, a behavior outlier rule, a cross-border cash rule, a foreign cash out rule, a high risk countries rule, an external funding rule, a tax refund rule, a card-to-card transfer rule, a watch list rule, or a manual trigger rule.

8. The computing system of claim 1, wherein the alert comprises information identifying a user associated with a prepaid card that caused the computing system to determine that the behavior is risky.

9. The computing system of claim 1, wherein the program instructions are further configured to cause the computing system to determine that the behavior is risky in response to a determination that a first regulation is violated.

10. The computing system of claim 1, wherein the program instructions are further configured to cause the computing system to transmit the alert via one of an email, a push notification, or a text message.

11. The computing system of claim 1, wherein the alert comprises a URL, and wherein receipt of the alert causes a browser to open on a user device and be redirected to a page associated with the URL.

12. The computing system of claim 2, wherein the program instructions are further configured to cause the computing system to:

receive, from the user, a selection of the button;

update the interactive user interface to display a plurality of actions in response to receiving the selection;

receive, from the user, a second selection of a first action in the plurality of actions; and generate a report in response to receiving the second selection.

13. The computing system of claim 3, wherein the program instructions are further configured to cause the computing system to update the clustering process based on actions taken by a user with regard to the generated alerts for each of the items in the third subset of the modified first data or the second data.

14. The computing system of claim 4, wherein the program instructions are further configured to cause the computing system to:

identify, based on an analysis of the modified first data and the second data, that a first user withdrew no money on a first day, no money on a second day, a first amount of money on a third day, no money on a fourth day, and no money on a fifth day, wherein a withdrawal of the first amount of money causes the computing system to determine that the behavior is risky; and generate the alert such that the alert corresponds with the first day, the second day, and the third day, does not correspond with the second day, the third day, and the fourth day, and does not correspond with the third day, the fourth day, and the fifth day.

15. A computer-implemented method comprising:

as implemented by one or more computer systems comprising a processor and memory, the one or more computer systems configured with specific executable instructions stored in the memory, in response to execution by the processor of at least one of the specific executable instructions read from the memory, selecting a first rule from a plurality of rules, wherein the first rule is associated with a behavior associated with one or more accounts;

retrieving a first data set and a second data set, wherein the first data set comprises a first data section, a second data section, and first data, wherein the first data comprises a first subset of data and a second subset of data, and wherein the second data set comprises the first data section, a third data section, and second data;

determining that the first rule does not use the second subset of data to determine whether the behavior is risky;

removing the second subset of data from the first data to form modified first data in response to the determination that the first rule does not use the second subset of data to determine whether the behavior is risky;

identifying that the first data section is included in the first data set and the second data set;

generating a third data set that comprises the first data section, the second data section, the third data section, the modified first data, and the second data;

running the first rule on the third data set to determine whether the behavior is risky;

generating an alert in response to a determination that the behavior is risky; and transmitting the alert for display in an interactive user interface.

16. The computer-implemented method of claim 15, further comprising:

using a clustering process to separate the modified first data and the second data into a plurality of clusters;

identifying a third subset of the modified first data or the second data that fall outside of a first cluster in the plurality of clusters by at least a threshold value; and generating an alert for each of the items in the third subset of the modified first data or the second data.

17. The computer-implemented method of claim 16, further comprising:

retrieving historical data, wherein running the first rule on the historical data causes the one or more computer systems to determine that the behavior is risky;

merging the modified first data and the historical data;

running the first rule on the merged modified first data and historical data;

determining whether the behavior is risky; and determining that the modified first data is valid in response to a determination that the behavior is risky.

18. A non-transitory computer-readable medium comprising one or more program instructions recorded thereon, the instructions configured for execution by a computing system comprising one or more processors in order to cause the computing system to:

select a first rule from a plurality of rules, wherein the first rule is associated with a behavior associated with one or more accounts;

retrieve a first data set and a second data set, wherein the first data set comprises a first data section, a second data section, and first data, wherein the first data comprises a first subset of data and a second subset of data, and wherein the second data set comprises the first data section, a third data section, and second data;

determine that the first rule does not use the second subset of data to determine whether the behavior is risky;

remove the second subset of data from the first data to form modified first data in response to the determination that the first rule does not use the second subset of data to determine whether the behavior is risky;

identify that the first data section is included in the first data set and the second data set;

generate a third data set that comprises the first data section, the second data section, the third data section, the modified first data, and the second data;

run the first rule on the third data set to determine whether the behavior is risky;

generate an alert in response to a determination that the behavior is risky; and transmit the alert for display in an interactive user interface.

19. The non-transitory computer-readable medium of claim 18, wherein the instructions are further configured to cause the computing system to:

use a clustering process to separate the modified first data and the second data into a plurality of clusters;

identify a third subset of the modified first data or the second data that fall outside of a first cluster in the plurality of clusters by at least a threshold value; and generate an alert for each of the items in the third subset of the modified first data or the second data.

20. The non-transitory computer-readable medium of claim 18, wherein the instructions are further configured to cause the computing system to:

retrieve historical data, wherein running the first rule on the historical data causes the one or more computer systems to determine that the behavior is risky;

merge the modified first data and the historical data;

run the first rule on the merged modified first data and historical data;

determine whether the behavior is risky; and determine that the modified first data is valid in response to a determination that the behavior is risky.

* * * * *